(12) United States Patent
Morooka

(10) Patent No.: US 9,696,954 B2
(45) Date of Patent: Jul. 4, 2017

(54) INFORMATION PROCESSING APPARATUS AND INFORMATION PROCESSING METHOD FOR EXECUTING PRINT PROCESSING USING HOT FOLDER

(71) Applicant: CANON KABUSHIKI KAISHA, Tokyo (JP)

(72) Inventor: Hidekazu Morooka, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/661,941

(22) Filed: Mar. 18, 2015

(65) Prior Publication Data

US 2015/0193176 A1    Jul. 9, 2015

Related U.S. Application Data

(63) Continuation of application No. 11/849,965, filed on Sep. 4, 2007, now abandoned.

(30) Foreign Application Priority Data

Nov. 8, 2006 (JP) .................. 2006-303086

(51) Int. Cl.
G06F 15/00 (2006.01)
G06F 3/12 (2006.01)

(52) U.S. Cl.
CPC ............ G06F 3/127 (2013.01); G06F 3/1204 (2013.01); G06F 3/1208 (2013.01); G06F 3/1285 (2013.01)

(58) Field of Classification Search
CPC ...................................................... G06F 3/127
(Continued)

(56) References Cited

U.S. PATENT DOCUMENTS 7,027,179 B2    4/2006 Mori
2003/0053082 A1    3/2003 Tomito
(Continued)

FOREIGN PATENT DOCUMENTS

JP    2000-118095    4/2000
JP    2000-118096    4/2000
(Continued)

OTHER PUBLICATIONS

Machine translation of Japanese Patent Document No. 2005-208688, Kato Kazunori, Aug. 4, 2005.*

*Primary Examiner* — Mark Milia
(74) *Attorney, Agent, or Firm* — Fitzpatrick, Cella, Harper & Scinto

(57) ABSTRACT

The present invention intends to improve usability in entering print data using a hot folder. If exceptional setting for the page is set in the print setting, which is to be applied to the print data entered into the folder, when it is detected that the print data is entered into the folder, the total number of pages of the print data is calculated, and whether the calculated total number of pages fulfills the exceptional setting in the print setting or not is determined. If the calculated total number of pages fulfills the exceptional setting according to the determination, the print job including the print data and the setting of the print setting is generated. If the calculated total number of pages does not fulfill the exceptional setting, the print setting and the print data are matched.

12 Claims, 22 Drawing Sheets

| SETTING | PRINT SETTING | SETTING RANGE | NUMBER OF OBJECTIVE PAGES |
|---|---|---|---|
| BASIC SETTING | A4, ORIENTATION: VERTICAL, STAPLED LEFT, AUTOMATIC, SINGLE - SIDED PRINTING, ETC. | ENTIRE | / |
| COVER SHEET SETTING | DOUBLE - SIDED, COLOR SETTING (COLOR) | 1 - 2 | 2 |
| EXCEPTIONAL SETTING | 3 - 4PAGES, COLOR SETTING (MONOCHROME) | 3 - 4 | 2 |
| BACK COVER SETTING | DOUBLE - SIDED, COLOR SETTING (COLOR) | UNKOWN (-2 - -1) | 2 |

(58) Field of Classification Search
USPC .......................................................... 358/1.18
See application file for complete search history.

(56) References Cited

U.S. PATENT DOCUMENTS

| | | |
|---|---|---|
| 2003/0053105 A1 | 3/2003 | Morooka |
| 2003/0112456 A1 | 6/2003 | Tomita |
| 2003/0184787 A1 | 10/2003 | Kuroda |
| 2004/0046797 A1 | 3/2004 | Perry |
| 2004/0060010 A1 | 3/2004 | Bright |
| 2004/0156069 A1 | 8/2004 | Kurotsu |
| 2004/0160613 A1 | 8/2004 | Kurotsu |
| 2005/0152000 A1 | 7/2005 | Van de Capelle |
| 2005/0289460 A1* | 12/2005 | Tomita .................... G06F 17/24 |
| | | 715/255 |
| 2007/0133032 A1 | 6/2007 | Robinson |

FOREIGN PATENT DOCUMENTS

| | | |
|---|---|---|
| JP | 2004-126871 | 4/2004 |
| JP | 2005-208688 | 8/2005 |

* cited by examiner

| SETTING | PRINT SETTING | SETTING RANGE | NUMBER OF OBJECTIVE PAGES |
|---|---|---|---|
| BASIC SETTING | A4, ORIENTATION: VERTICAL, STAPLED LEFT, AUTOMATIC, SINGLE - SIDED PRINTING, ETC. | ENTIRE | / |
| COVER SHEET SETTING | DOUBLE - SIDED, COLOR SETTING (COLOR) | 1 – 2 | 2 |
| EXCEPTIONAL SETTING | 3 - 4PAGES, COLOR SETTING (MONOCHROME) | 3 – 4 | 2 |
| BACK COVER SETTING | DOUBLE - SIDED, COLOR SETTING (COLOR) | UNKOWN (-2 – -1) | 2 |

FIG. 12A

| COUNTER | 1 | 2 | 3 | 4 | 5 | 6 |
|---|---|---|---|---|---|---|
| Page NUMBER | 1 | 2 | -2 | -1 | 3 | 4 |
| Page ATTRIBUTE | COVER SHEET | BACK OF COVER SHEET | BACK OF BACK COVER | BACK COVER | EXCEPTION 1 | EXCEPTION 1 |
| ASSOCIATION WITH PRINT DATA | NONE | NONE | NONE | NONE | NONE | NONE |
| PRINT DATA Page | NONE | NONE | NONE | NONE | NONE | NONE |

FIG. 12B

| COUNTER | 1 | 2 | 3 | 4 | 5 | 6 |
|---|---|---|---|---|---|---|
| Page NUMBER | 1 | 2 | -2 | -1 | 3 | 4 |
| Page ATTRIBUTE | COVER SHEET | BACK OF COVER SHEET | BACK OF BACK COVER | BACK COVER | EXCEPTION 1 | EXCEPTION 1 |
| ASSOCIATION WITH PRINT DATA | PRESENT | PRESENT | PRESENT | PRESENT | NONE | NONE |
| PRINT DATA Page | 1 | 2 | 3 | 4 | NONE | NONE |

FIG. 13A

| COUNTER | 1 | 2 | 3 | 4 | 5 | 6 |
|---|---|---|---|---|---|---|
| Page NUMBER | 1 | 2 | 3 | 4 | -2 | -1 |
| Page ATTRIBUTE | COVER SHEET | BACK OF COVER SHEET | EXCEPTION 1 | EXCEPTION 1 | BACK COVER | BACK OF BACK COVER |
| ASSOCIATION WITH PRINT DATA | NONE | NONE | NONE | NONE | NONE | NONE |
| PRINT DATA Page | NONE | NONE | NONE | NONE | NONE | NONE |

FIG. 13B

| COUNTER | 1 | 2 | 3 | 4 | 5 | 6 |
|---|---|---|---|---|---|---|
| Page NUMBER | 1 | 2 | 3 | 4 | -2 | -1 |
| Page ATTRIBUTE | COVER SHEET | BACK OF COVER SHEET | EXCEPTION 1 | EXCEPTION 1 | BACK COVER | BACK OF BACK COVER |
| ASSOCIATION WITH PRINT DATA | PRESENT | PRESENT | PRESENT | PRESENT | NONE | NONE |
| PRINT DATA Page | 1 | 2 | 3 | 4 | NONE | NONE |

WHEN PRINT SETTING IS APPLIED TO PRINT DATA, BLANK SHEET IS INSERTED AT 3, 4 PAGES OF PRINT DATA AS PRINT DATA IS TOO SMALL

WHEN PRINT SETTING IS APPLIED TO PRINT DATA, BLANK SHEET IS INSERTED AT 5, 6 PAGES OF PRINT DATA AS PRINT DATA IS TOO SMALL

FIG. 17

| SETTING | PRINT SETTING | SETTING RANGE | NUMBER OF OBJECTIVE PAGES |
|---|---|---|---|
| COVER SHEET SETTING | DOUBLE-SIDED, COLOR SETTING (COLOR) | 1 – 2 | 2 |
| EXCEPTIONAL SETTING 1 | COLOR SETTING (MONOCHROME) | 3 – 6 | 4 |
| EXCEPTIONAL SETTING 2 | DOUBLE-SIDED, COLOR SETTING (COLOR) | 7 – 10 | 4 |
| EXCEPTIONAL SETTING 3 | COLOR SETTING (MONOCHROME) | 11 – 14 | 4 |
| EXCEPTIONAL SETTING 4 | COLOR SETTING (MONOCHROME) | 15 | 1 |
| BACK COVER SETTING | DOUBLE-SIDED, COLOR SETTING (COLOR) | UNKNOWN (-2 – -1) | 2 |

FIG. 20A

| PRINT DATA Page NUMBER | 3 | 4 | 6 |
|---|---|---|---|
| EXCEPTIONAL SETTING ASSOCIATION INFORMATION | EXCEPTION 1 | EXCEPTION 2 | EXCEPTION 3 |

FIG. 20B

| COUNTER | 1 | 2 | 3 | 4 | 5, 6, 7, 8 | 9, 10, 11, 12 | 13, 14 15, 16 | 17 |
|---|---|---|---|---|---|---|---|---|
| Page NUMBER | 1 | 2 | -2 | -1 | 3 – 6 | 7 – 10 | 11 – 14 | 15 |
| Page ATTRIBUTE | COVER SHEET | BACK OF COVER SHEET | BACK COVER | BACK OF BACK COVER | EXCEPTION 1 | EXCEPTION 2 | EXCEPTION 3 | EXCEPTION 4 |
| PRINT SIDE SETTING | DOUBLE-SIDED (FACE) | DOUBLE-SIDED (FACE) | DOUBLE-SIDED (FACE) | DOUBLE-SIDED (FACE) | SINGLE-SIDED | DOUBLE-SIDED | SINGLE-SIDED | SINGLE-SIDED |
| ASSOCIATION WITH PRINT DATA | NONE | NONE | NONE | NONE | NONE | NONE | NONE | NONE |
| PRINT DATA Page | NONE | NONE | NONE | NONE | NONE | NONE | NONE | NONE |

FIG. 20C

| COUNTER | 1 | 2 | 3 | 4 | 5, 6, 7, 8 | 9, 10, 11, 12 | 13, 14 15, 16 | 17 |
|---|---|---|---|---|---|---|---|---|
| Page NUMBER | 1 | 2 | -2 | -1 | 3 – 6 | 7 – 10 | 11 – 14 | 15 |
| Page ATTRIBUTE | COVER SHEET | BACK OF COVER SHEET | BACK COVER | BACK OF BACK COVER | EXCEPTION 1 | EXCEPTION 2 | EXCEPTION 3 | EXCEPTION 4 |
| PRINT SIDE SETTING | DOUBLE-SIDED (FACE) | DOUBLE-SIDED (FACE) | DOUBLE-SIDED (FACE) | DOUBLE-SIDED (FACE) | SINGLE-SIDED | DOUBLE-SIDED | SINGLE-SIDED | SINGLE-SIDED |
| ASSOCIATION WITH PRINT DATA | PRESENT | PRESENT | PRESENT | PRESENT | PART | PART | PART | NONE |
| PRINT DATA Page | 1 | 2 | 7 | 8 | 3 | 4, 5 | 6 | NONE |

INFORMATION PROCESSING APPARATUS AND INFORMATION PROCESSING METHOD FOR EXECUTING PRINT PROCESSING USING HOT FOLDER

This application is a continuation of application Ser. No. 11/849,965, filed Sep. 4, 2007.

BACKGROUND OF THE INVENTION

Field of the Invention

The present invention relates to information processing apparatus and information processing method for generating a print job and sending the print job to a printing apparatus when contents (print data) are entered into a hot folder.

Description of the Related Art

As a system for entering a print job into printing apparatus, systems using a hot folder have been developed (see Japanese Patent Application Laid-Open No. 2000-118095, for example). The hot folder is generally a folder created on a PC. A resident application program called hot folder manager checks whether a document is entered into the hot folder or not by predetermined period.

When the hot folder manager recognizes that a document has been entered into a hot folder, it determines whether the entered document (hereinafter also referred to as entered contents) is in a form that can be processed at the printing apparatus side or not (for example, PDF, PS, TIFF, JPEG).

The hot folder has a job summit function for sending the entered contents to the printing apparatus previously specified in the hot folder, when the entered contents are determined as in a form that can be processed at the printing apparatus side.

The hot folder manager can also previously set print setting for the hot folder. The system including such a hot folder manager and a hot folder creates print setting that has been set as a job ticket and adds to the entered contents. There are hot folder managers with a job ticket adding function for sending a job ticket and entered contents as a print job to printing apparatus.

In the POD (Print On Demand) market, creating a high-value added printed material such as case binding with different print medium types and printing quality for each page instead of a simple printed material such as those created in conventional office printing is needed. Accordingly, it is desired that the hot folder for the POD system has print setting different for each unit of page/page area) previously set. In the POD system, not only a digital photograph printer but also various devices such as an offset printer are assumed as the destination of a job. Accordingly, the job ticket, which is print setting, needs to match the specification of the industrial standard as the JDF (Job Definition Format). Hereinafter, the job ticket in the specification of the industrial standard is called the JDF.

In the JDF, it is defined to specify the final page by '−1' and the page previous to the final page by '−2' with '−1' being a base for specifying the final page of the entered contents. Such a specifying method needs to be used in the JDF. If the print setting for the back cover is set independent of the print setting for the body as exceptional page setting in the hot folder and the total number of pages of the entered contents is insufficient for the print setting, the print setting contradicts with the entered contents.

If the entered contents are inconsistent with the print setting of the job ticket added in the hot folder, the output specification depends on the processing at the printing apparatus. That may result in cancellation of the job, hung up due to an error, implementation of print ignoring the print setting inconsistent with the entered contents in some units of printing apparatus. As a result, printed materials from printing apparatus in different models or from different manufacturers appear different. That poses a problem in that the printed materials with inconsistent appearances are provided for a user such as a client of printing or an operator, which is inconvenient.

SUMMARY OF THE INVENTION

The present invention intends to improve usability in entering print data using a hot folder.

If exceptional setting for the page is set in the print setting, which is to be applied to the print data entered into the folder, when it is detected that the print data is entered into the folder, the total number of pages of the print data is calculated, and whether the calculated total number of pages fulfills the exceptional setting in the print setting or not is determined. If the calculated total number of pages fulfills the exceptional setting according to the determination, the print job including the print data and the setting of the print setting is generated.

If the calculated total number of pages does not fulfill the exceptional setting, the print setting and the print data are matched.

The matching is processing for changing the print setting so as not to be inconsistent with the print data.

The matching is processing for changing the print data to mach the print setting.

For the purpose of achieving the abovementioned objects, according to the first aspect of the present invention, an information processing apparatus is provided which comprises: a detection unit adapted to detect that contents are entered into a folder; a calculation unit adapted to calculate the total number of pages of the contents when exceptional setting is set for a page in print setting to be applied to the contents entered in the folder; a determination unit adapted to determine whether the total number of pages calculated by the calculation unit fulfills the exceptional setting in the print setting; and a job generation unit adapted to generate a print job including the contents and setting of the print setting when the determination unit determines that the calculated total number of pages fulfills the setting of the exceptional setting.

For the purpose of achieving the abovementioned objects, according to the second aspect of the present invention, an information processing method is provided which comprises the steps of: detecting that contents are entered, into a folder; calculating the total number of pages of the contents when exceptional setting is set for a page in print setting to be applied to the contents entered in the folder; determining whether the total number of pages calculated at the calculating fulfills the exceptional setting in the print setting; and generating a print job including the contents and setting of the print setting when it is determined in the determining step that the calculated total number of pages fulfills the setting of the exceptional setting.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12A is a diagram (I) illustrating an example of application of a print setting table.

FIG. 12B is a diagram illustrating an example of a print setting table for a result of a series of processing at steps S903 to S905 performed on print data with the total number of pages four.

FIG. 13A is a diagram illustrating an example of a print setting table before the series of processing at steps S903 to S905 when the processing mode B is applied.

FIG. 13B is a diagram illustrating an example of a print setting table after the series of processing at steps S903 to S905 when a processing mode B is applied.

FIG. 17 is a diagram illustrating an example of print setting in a third embodiment.

FIG. 20A is a diagram illustrating an example of an exceptional setting association information table.

FIG. 20B is a diagram illustrating an example of an initialized print setting table.

FIG. 20C is a diagram illustrating a result of processing at steps S2103 to S2210 on the print setting table using information in the exceptional setting association information table shown in FIG. 20A.

DESCRIPTION OF THE EMBODIMENTS

Preferred embodiments of the present invention will now be described in detail in accordance with the accompanying drawings.

Embodiments of the present invention will be described with reference to the drawings.

(First Embodiment)

<Exemplary Configuration of Print Processing System>

Figure 1:
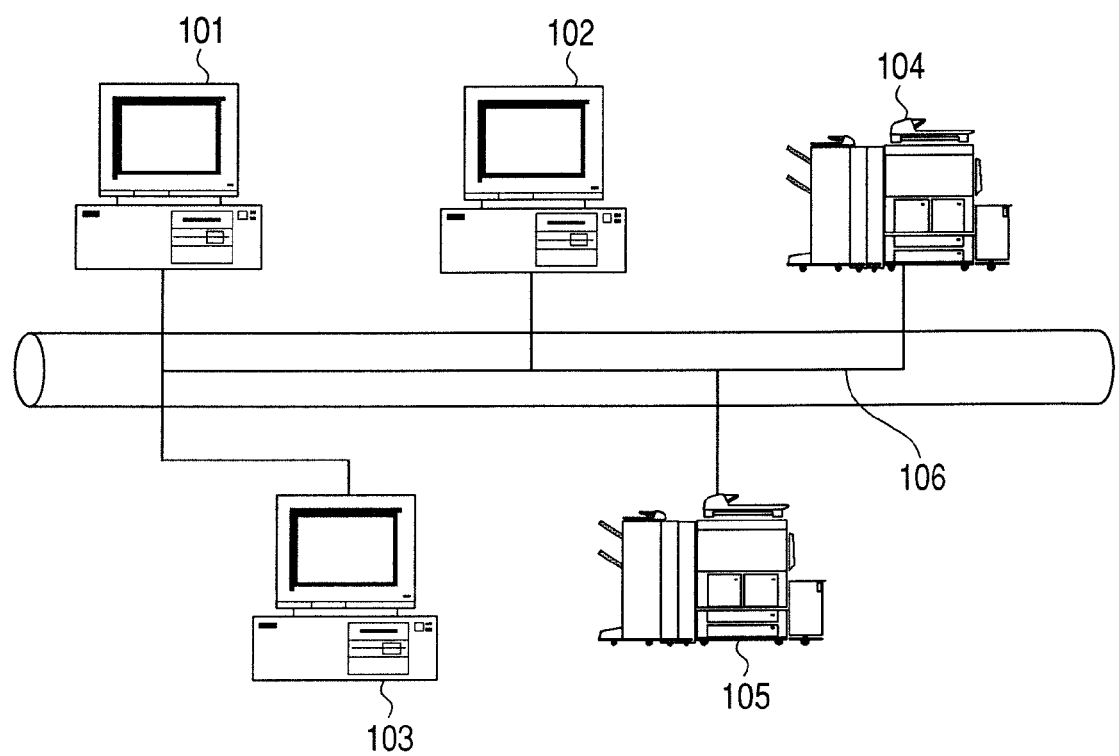
FIG. 1 is a diagram illustrating entire configuration of a print system according to the embodiment.

FIG. 1 is a diagram illustrating entire configuration of a print system according to the embodiment. The environment of the entire of the print system in the description below is assumed for simplifying the description on the embodiment. The system is not limited to be used in the described environment.

In FIG. 1, the reference numerals 101, 102, 103 designate network computers, each of which can be used as an information processing apparatus of the present invention. The network computers are connected with the network 106 to communicate with each other. Each of the network computers 101, 102, 103 is typically a personal computer (PC) connected with the network 106 via a network cable such as Ethernet (registered trademark). Each of the network computers 101, 102, 103 can execute various types of programs such as application programs. Each of the network computers 101, 102, 103 has a function of transferring print data to the network printers 104, 105.

The reference numerals 104, 105 designate network printers as print controlling apparatus. The network printers 104, 105 are connected with the network 106 via a network interface (not shown). Each of the network printers 104, 105 analyzes a print job including typing data sent from the network computer, converts the print job into a dot image for each page and prints them. Functions of the network printers may differ from each other.

The reference numeral 106 designates a network. The network 106 connects the network computers 101, 102, 103, the network printers 104, 105.

<Example of Hardware Configuration of the Network Computer>

Figure 2:
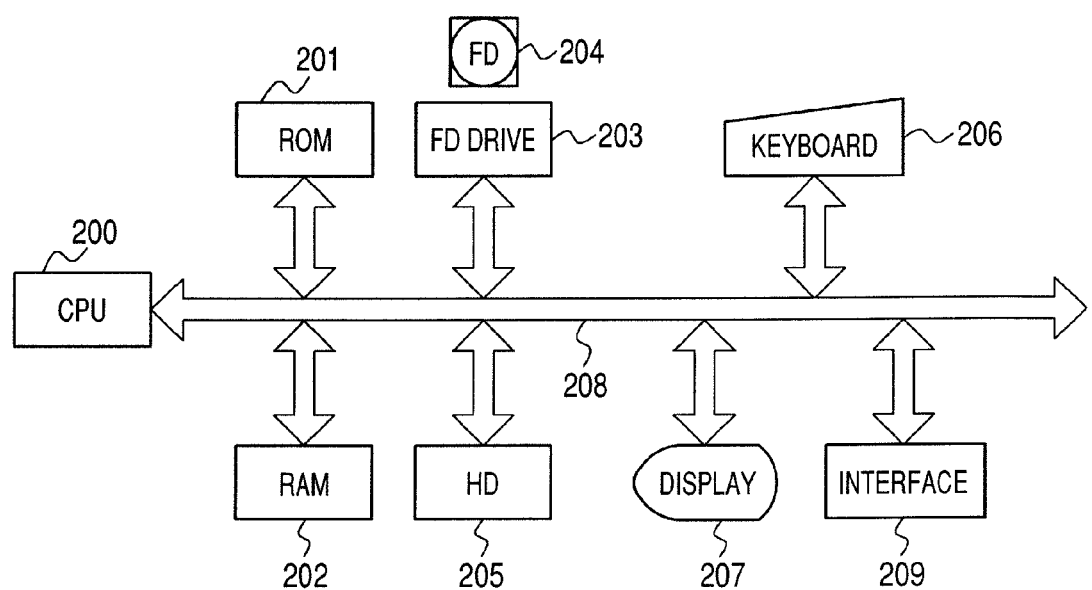
FIG. 2 is a block diagram for describing configuration of network computers 101 to 103.

FIG. 2 is a block diagram for describing configuration of network computers 101 to 103.

In FIG. 2, the reference numeral 200 designates a CPU for controlling over the apparatus. The CPU 200 executes an application program, a printer driver program and an OS (operating system) stored in the hard disk (HD) 205, and a network printer controlling program of the embodiment.

Then, the CPU 200 controls to temporally store information, a file or the like required for executing a program in a RAM 202.

The reference numeral 201 designates a ROM as a storage unit. The ROM 201 stores programs such as a base I/O program, font data used in document processing and various types of data for template. The reference numeral 202 designates a RAM as a temporal storage unit. The RAM 202 functions as main memory, a work area of the CPU 200.

Figure 5:
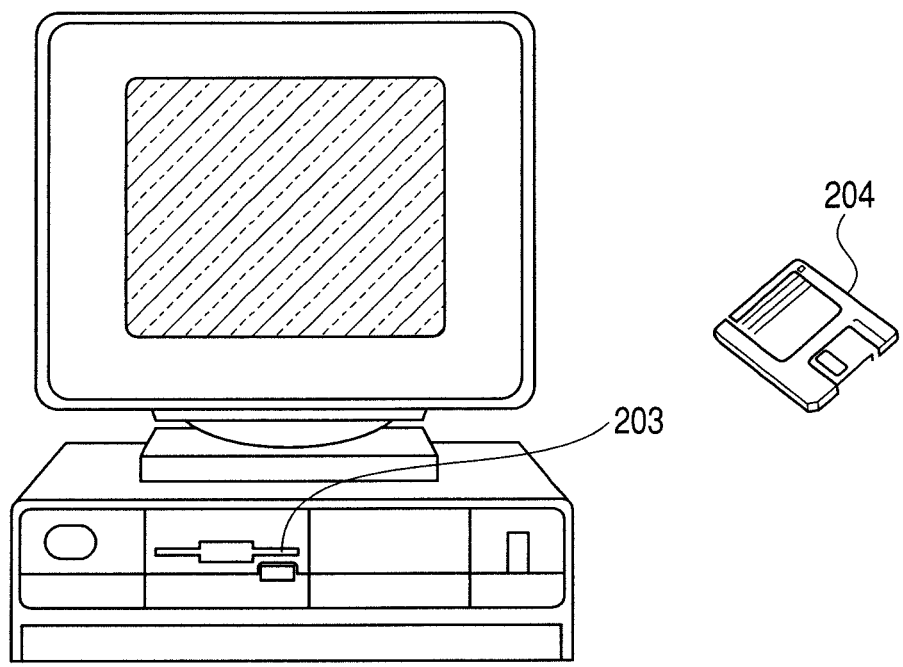
FIG. 5 is a diagram illustrating relationship between an FD drive 203 shown in FIG. 2 and an FD 204 to be inserted into the FD drive 203.

The reference numeral 203 designates a floppy disk drive (FD drive) as a storage medium reading unit. As shown in FIG. 5 to be described later, a program or the like stored in the floppy disk 204, which is used as a storage medium, can be loaded on a network computer via the FD drive 203. The reference numeral 204 is a floppy disk (FD) which is a storage medium. The FD 204 is a storage medium that stores a program in a computer readable manner. The storage medium is not limited to the FD and any type of storage medium such as a CD-ROM, a CDR, a CDRW, a PC card, a DVD, an IC memory card, an MO, a memory stick may be used.

The reference numeral 205 is one of external storage units and a hard disk (HD) that functions as large-capacity memory. The HD 205 stores an application program, a printer driver program, an OS, a control program for the hot folder manager of the present invention, an associated program.

The reference numeral 206 is a keyboard, which is a specification inputting unit, for a user to input and specify an order of a control command for a device into a client computer or an operator or an administrator to do so to a print server. The reference numeral 207 is a display, which is a display unit, for displaying a command input from the keyboard 206 or a state of the printer.

The reference numeral 208 is a system bus for administrating a flow of data in a computer. The reference numeral 209 is an interface, which is an input/output unit. The network computer exchanges data with an external device via the interface 209.

The abovementioned configuration of the network computer is merely an example. The network computer is not limited to the example of configuration illustrated in FIG. 2. The place to store data or a program may be changed to a ROM, a RAM, an HD and the like according to the property of the data or the program.

Figure 3:
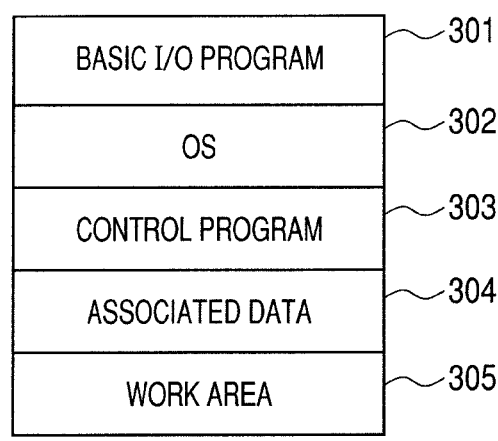
FIG. 3 is a diagram illustrating an example of memory map of a RAM 202 shown in FIG. 2.

FIG. 3 is a diagram illustrating an example of memory map of a RAM 202 shown in FIG. 2. In FIG. 3, a control program according to the embodiment loaded from the FD 204 indicates a memory map that is loaded to the RAM 202 and can be executed.

The embodiment describes an example, in which the control program and the associated data are directly loaded from the FD 204 to the RAM 202 and executed. The present invention may be adapted to load a control program, which is once installed from the FD 204 to the HD 205, to the RAM 202 each time the program is operated instead of the embodiment. The medium for storing the control program may be a CD-ROM, a CDR, a PC card, a DVD, an IC memory card other than the FD. The present invention may also be adapted to store the control program in the ROM 201, include the ROM 201 in a memory map and directly execute the control program in the CPU 200. The present invention may also be adapted to use software programs for implementing the same functions as those in the respective devices in the place of the hardware devices.

The reference numeral 301 designates a basic I/O program, which is a region storing a program with IPL (initial program loading) functions for reading an OS from the HD 205 to the RAM 202 when the computer is switched on and starting operations of the OS.

The reference numeral 302 is an OS that is stored in a region reserved on the RAM 202. The reference numeral 303 is a control program that is stored in a region reserved on the RAM 202. The reference numeral 304 is associated data that is stored in a region reserved on the RAM 202. The reference numeral 305 is a work area for which a region for the CPU 200 to execute the control program is reserved on the RAM 202.

Figure 4:
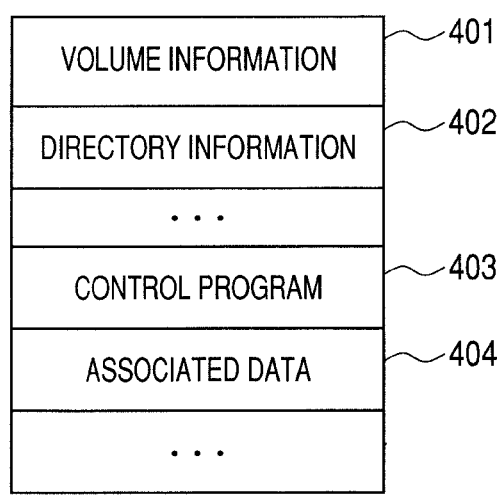
FIG. 4 is a diagram illustrating an example of memory map of an FD 204 shown in FIG. 2.

FIG. 4 is a diagram illustrating an example of memory map of an FD 204 shown in FIG. 2.

In FIG. 4, the reference numeral 401 designates volume information indicating information on data. The reference numeral 402 designates directory information. The reference numeral 403 designates a control program according to the embodiment. The reference numeral 404 designates associated data according to the control program.

FIG. 5 is a diagram illustrating relationship between an FD drive 203 shown in FIG. 2 and an FD 204 to be inserted into the FD drive 203. As mentioned above, the abovementioned control program and associated data in the embodiment are stored in the FD 204.

<Example of Software Configuration in the Embodiment>

Figure 6:
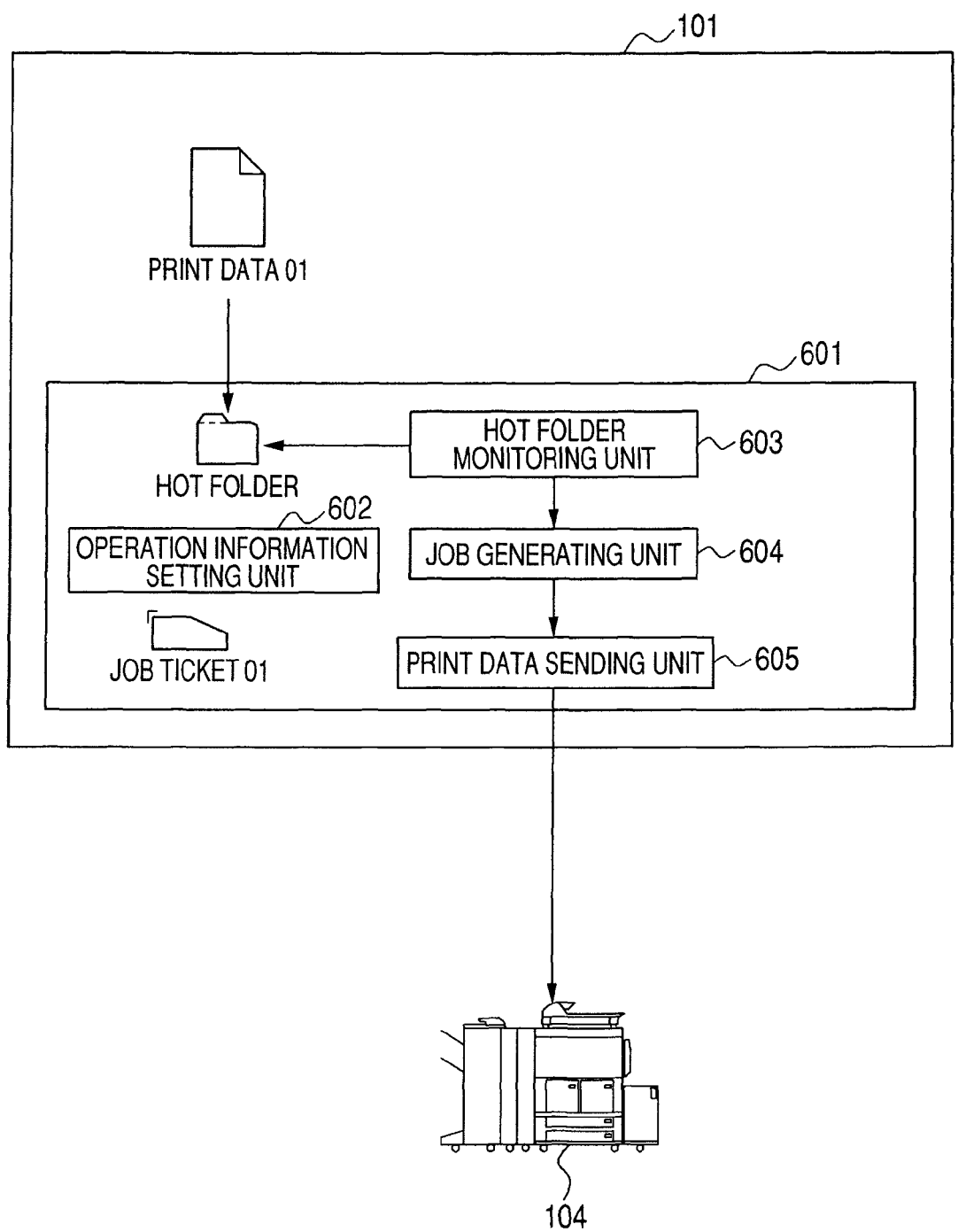
FIG. 6 is a schematic diagram illustrating the configuration of the print system 601 of the embodiment shown for each functional module.

FIG. 6 is a schematic diagram illustrating the configuration of the print system 601 of the embodiment shown for each functional module.

The reference numeral 601 designates a print system of the hot folder manager that processes print data entered into the hot folder (HF) of the client 101.

The reference numeral 602 designates an operation information setting unit for causing operation setting of an interval of monitoring a hot folder, the presence of entering or log file saving, or print setting to be set in the entered print data to be set, and performing setting relating to operations of the HF such as setting the set value as the job ticket 01.

The reference numeral 603 designates a hot folder monitoring unit for monitoring entering of the print data into the hot folder by a predetermined time period.

The reference numeral 604 designates a job generating unit for examining whether the print setting contradicts with the print data or not based on the print data 01 entered into the hot folder and the job ticket 01 set in the output information setting unit 602. If the print setting and the print data contradict with each other, the job generating unit 604 generates a job with the contradiction corrected (print data+job ticket).

The reference numeral 605 designates a print data sending unit for sending the job generated by the job generating unit 604 to the printer 104 that is set as a destination of output in the operation information setting unit 602.

<Description of Print Setting for the Hot Folder>

Print setting for the hot folder set by the operation setting unit 602 will be described with reference to FIG. 21 to FIG. 25.

Figure 21:
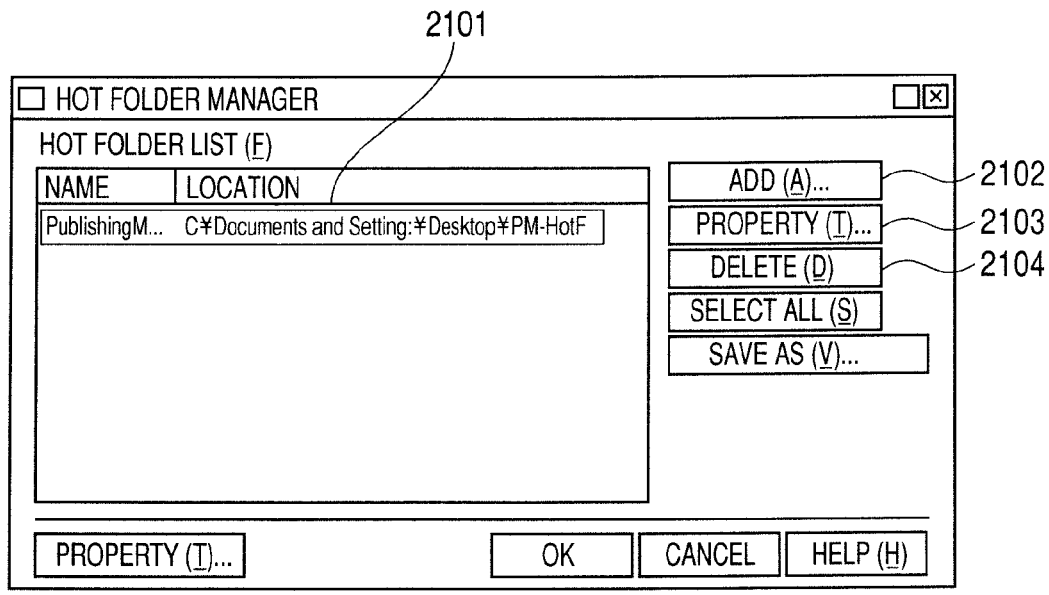
FIG. 21 is a diagram illustrating an example of a hot folder list screen provided by a hot folder manager.

FIG. 21 is a property screen of the hot folder manager 601. The reference numeral 2101 designates a display area for listing names and places (folder path) of hot folders to be monitored by the hot folder monitoring unit 603 of the hot folder manager 601. The display area 2101 displays the name and the place of one hot folder, but the hot folder monitoring unit 603 of the hot folder manager 601 may monitor a plurality of hot folders.

The reference numeral 2102 is a button for adding a new hot folder to be monitored. When the button is pressed, a dialog screen (not shown) is displayed. When a folder to be monitored is specified, the specified folder is registered as a hot folder.

The reference numeral 2103 is a property button. When a hot folder is selected from hot folders listed in the display area 2101 and the property button 2103 is pressed, a display screen for performing print setting for the selected hot folder (FIG. 22) is displayed.

The reference numeral 2104 is a deleting button. When the deleting button 2104 is pressed as the hot folder is selected, the selected hot folder can be deleted.

Figure 22:
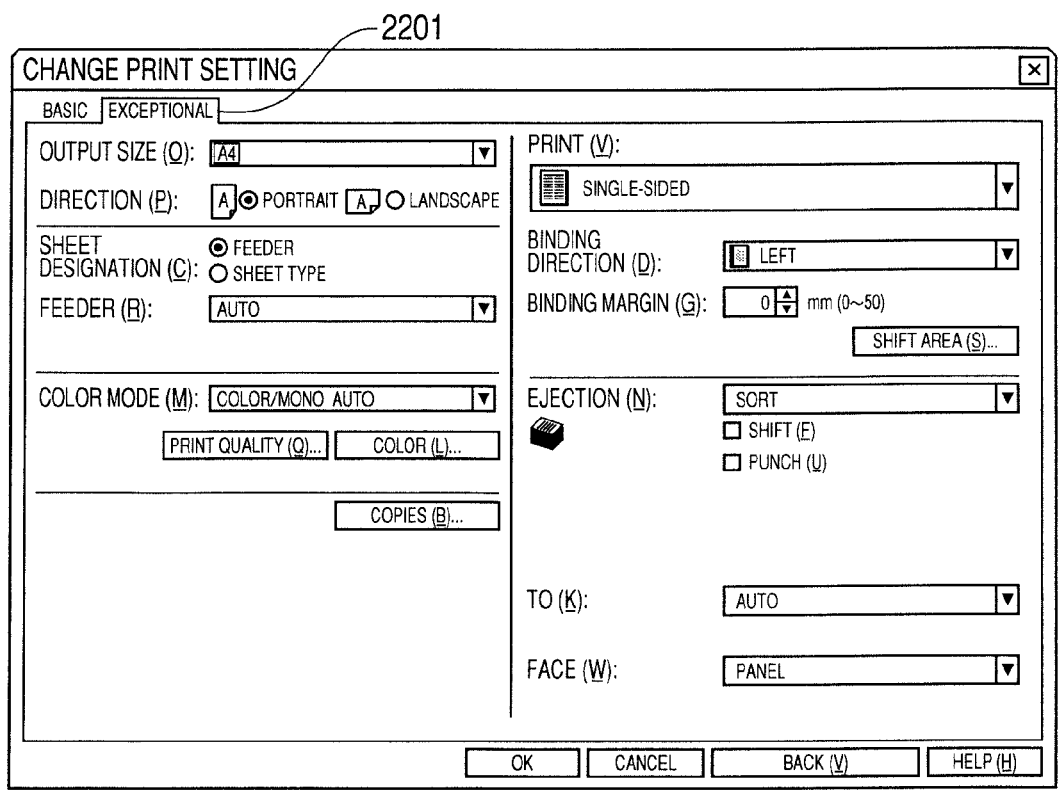
FIG. 22 is a diagram illustrating an example of a print setting screen to the hot folder to be selected provided by the hot folder manager.

FIG. 22 is a display screen displayed when the property button 2103 is pressed for enabling a user to perform print setting for the hot folder. FIG. 22 is a basic setting screen for enabling a user to perform print setting including the output sheet of paper size, the orientation of printing, a printing method, a sheet discharging method. The print setting set in the basic setting screen is the print setting for the entire print jobs. When print data is entered into the hot folder, the setting on the screen is described in the job ticket as the print setting for the entire print jobs.

The reference numeral 2201 is an exceptional setting tab for displaying an exceptional setting screen. When the exceptional setting tab 2201 is pressed, FIG. 23 is displayed.

Figure 23:
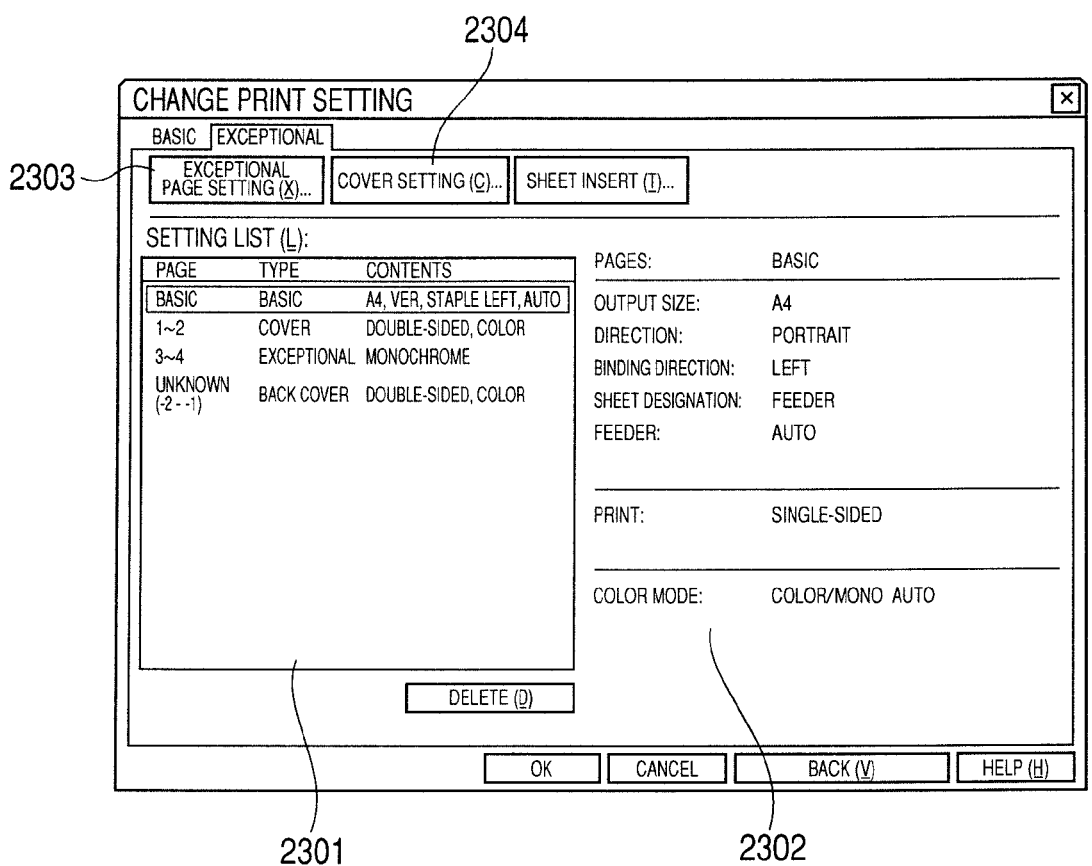
FIG. 23 is a diagram illustrating an example of a print setting screen for exceptional setting to the hot folder to be selected provided by the hot folder manager.

FIG. 23 is an exceptional setting screen for a user to set print setting different from the print setting for the entire print jobs with a range of pages specified. The reference numeral 2301 designates a display area for displaying a range of pages, for which print setting different from the print setting for the entire print jobs is set to be applied, and difference between the print setting and the print setting for the entire print jobs. The reference numeral 2302 designates a display area for displaying detailed print setting set for the range of pages in the basic setting or the exceptional setting selected in the display area designated by the reference numeral 2301.

Figure 25:
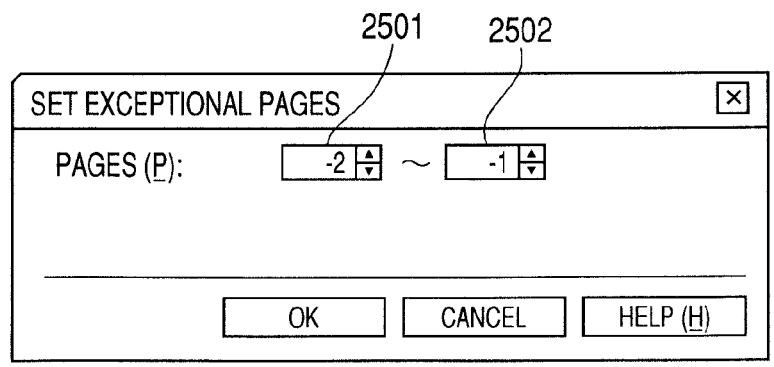
FIG. 25 is a diagram illustrating an example of a setting screen for setting a range of an exceptional page.

The reference numeral 2303 is a setting button for an exceptional page. When the button is pressed, a setting range screen for an exceptional page shown in FIG. 25 is displayed. The reference numeral 2304 is a setting button for a cover sheet. When the button is pressed, setting is done for adding a cover sheet to the printed material based on the print data.

FIG. 25 is an exceptional page setting range screen displayed when the setting button 2303 for the exceptional page is pressed. On the screen, a range to which exceptional page setting is to be applied can be specified. The start page of the range of exceptional pages can be set in the field designated by the reference numeral 2501, and the final page of the range of exceptional pages can be set in the field designated by the reference numeral 2502. The range of exceptional pages is generally specified by the number of pages. The hot folder manager of the embodiment also enables a negative integer to be specified to comply with the specification of the industrial standard such as the JDF (Job Definition Format). FIG. 25 shows an example of specification made by negative integers, with '−2' specified as the start page and '−1' specified as the final page. That integers indicate the number of pages the page concerned is from the final page. '−2' indicates that the page concerned is a page prior to the final page and '−1' indicates that the page concerned is the final page.

Figure 24:
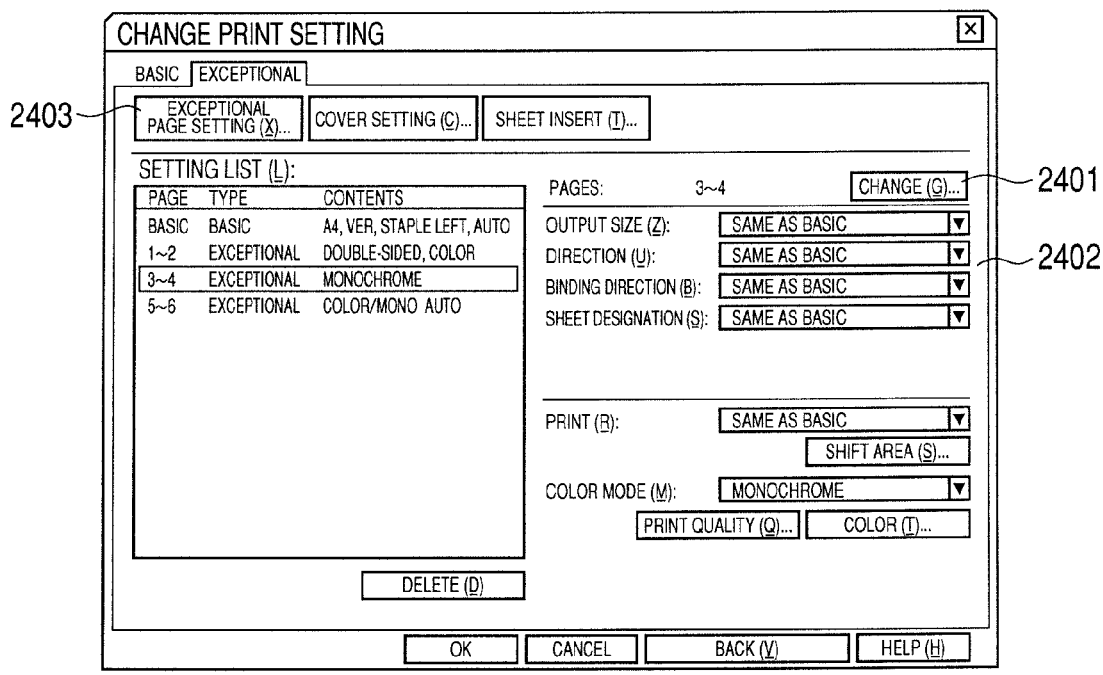
FIG. 24 is a diagram illustrating an example of a print setting screen for exceptional setting to the hot folder to be selected provided by the hot folder manager.

When a range of pages is specified in the exceptional page setting range screen shown in FIG. 25, what displayed on the exceptional setting screen shown in FIG. 23 changes to that on the screen shown in FIG. 24. In FIG. 23, as basic setting is selected in the display area 2301, the display area 2302 displays the print setting set on the basic setting screen (FIG. 22). In FIG. 24, as the range of exceptional pages is selected in the display area corresponding to the display area designated by the reference numeral 2301, the display area corresponding to the display area designated by the reference numeral 2302 displays a menu 2402 for a user to select whether it is set as the basic setting or not. The reference numeral 2401 designates a button for a user to change the range of exceptional pages. When the button 2401 is pressed, the exceptional page setting range screen shown in FIG. 25 is displayed.

The print setting set in from FIG. 22 to FIG. 25 in such a manner is the print setting for a hot folder for the operation information setting unit 602 and saved in the HD 205.

<Control Flowchart for Hot Folder Manager>

Figure 7:
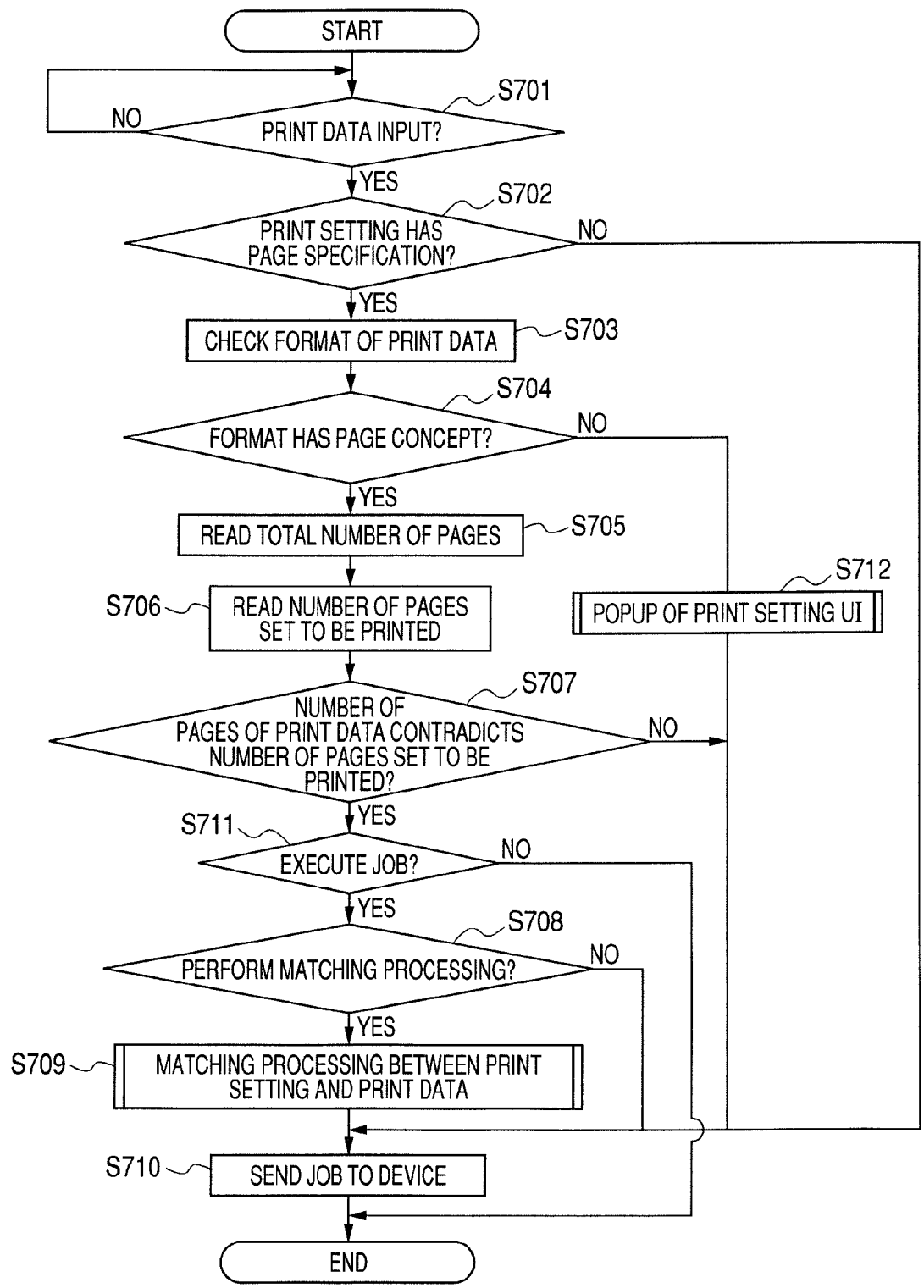
FIG. 7 is a diagram illustrating an example of processing by a hot folder monitoring unit 603 to detect that print data is entered into a hot folder, then by a job generating unit 604 to generate a job, and by a print data sending unit 605 to send a job to a printer 104.

FIG. 7 is a diagram illustrating an example of processing by a hot folder monitoring unit 603 to detect that print data is entered into a hot folder, then by a job generating unit 604 to generate a job, and by a print data sending unit 605 to send a job to a printer 104.

At step S701, the hot folder monitoring unit 603 determines whether the print data is entered in the hot folder or not. When it is detected that the data is entered, the operation proceeds to step S702 performed by the job generating unit 604. The steps S702 to S710 are detailed processing performed by the job generating unit 604.

At step S702, the job generating unit 604 reads the print setting information set by the operation information setting unit 602 from the HD 205 and determines whether the print setting information includes specification for a range of pages or not. The specification of a range of pages here means setting for exceptional pages set in FIG. 23 to FIG. 25 as mentioned above. For example, the printing setting different from the entire print setting (hereinafter, referred to as entire setting) is set for a certain range of pages such that monochrome printing is set from the page three to the page four, while color printing is set for the entire setting. If it is determined as a range of pages is specified at step S702, the operation proceeds to step S703. If it is determined as a range of pages is not specified, the operation proceeds to step S710. At step S710, the job generating unit 604 generates the job ticket 01 from the read print setting information and sends the print data 01 and the job ticket 01 as a print job to the device through the print data sending unit 605.

At step S703, the job generating unit 604 checks the file format of the print data 01 entered into the hot folder. Specifically, the job generating unit 604 checks the file format by checking an extension of a file of the entered print data or opening the file and checking the file header.

At step S704, the job generating unit 604 checks whether the file format checked at step S703 is the format with a concept of page or not. Specifically, the print system 601 previously registers a format with a concept of page (for example, PDF (Portable Document Format) or PS (Post script) in the HD 205), for example. If the extension of the file of the entered print data is '*.bmp' or '*.jpg', it means that it is an image format, thus, it is determined that it is not a format with a concept of page. If the extension of the file of the entered print data is '*.ps' or '*.pdf', it is determined that it is a format with a page concept.

If the format checked at step S703 matches the previously registered format and it is determined that it is the format with a concept of page, the job generating unit 604 proceeds to step S705. If the format does not match the previously registered format and it is not determined that it is the format with a concept of page, the job generating unit 604 proceeds to step S712.

Figures 8, 9:
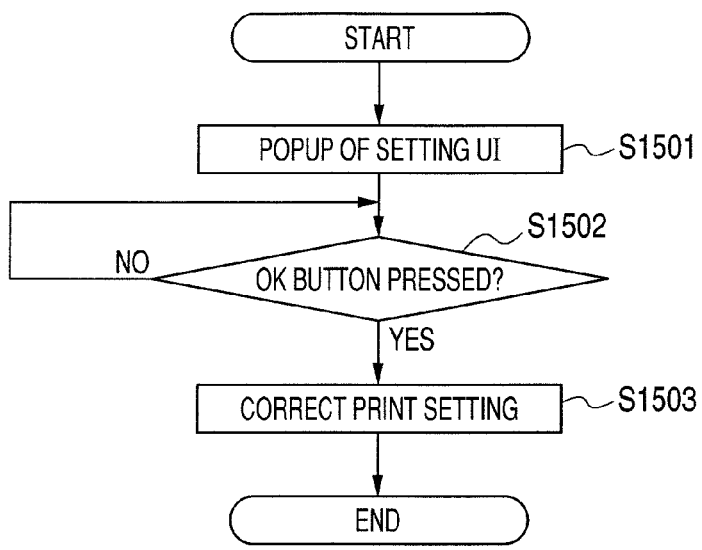
FIG. 8 is a diagram illustrating an example of processing of performing POPUP display on a print setting UI.
FIG. 9 is a diagram illustrating an example of print setting in a first embodiment.

At step S712, the job generating unit 604 performs POPUP display of the print setting UI. Detail of the processing at step S712 will be described with reference to FIG. 8. FIG. 8 is a diagram illustrating an example of processing of performing POPUP display on a print setting UI.

As the print data without a concept of page is entered, the print setting needs to be changed. Thus, at step S1501, the job generating unit 604 performs POPUP display of the print setting UI shown in FIG. 23 or FIG. 24 on the display 207. Accordingly, a user can change print setting by using the POPUP displayed print setting UI. For example, the user changes the print setting by using the print setting UI, and presses OK button displayed on the print setting UI. As step S1501, the job generating unit 604 may display a dialog screen that indicates a warning message "This file is not for a plurality of documents. The page exceptional setting will not be applied to this file." without displaying the above-mentioned print setting UI.

At step S1502, the job generating unit 604 determines whether the OK button is pressed or not from the print setting UI. When the OK button is pressed, the job generating unit 604 changes the print setting at step S1503 and proceeds to step S710 shown in FIG. 7. At step S1503, the job generating unit 604 generates the corrected print setting according to what is set at the print setting UI. At step S710, the job generating unit 604 generates the job ticket according to the corrected print setting and sends the job ticket and the print data to the printing apparatus as a job.

At step S705, the job generating unit 604 reads the total number of pages in the print data 01. Specifically, when the total number of pages is recorded at a predetermined place in a document of the print data, the job generating unit 604 reads the total number of pages of the print data. If the total number of pages is not recorded, the job generating unit 604 obtains the total number of pages by counting the number of times a page feed command in a document of the print data is recorded.

At step S706, the job generating unit 604 reads the total number of pages, to which print setting is adapted, set in the print setting set for the hot folder.

Here, a method for reading the number of pages by the job generating unit 604 will be described with reference to FIG. 9 by taking cover sheet setting, exceptional setting and back cover setting as an example. FIG. 9 is a diagram illustrating an example of print setting in the first embodiment.

The job generating unit 604 reads the number of objective pages for each setting range as shown in FIG. 9. As illustrated in FIG. 25, some systems take expressions for setting range as '−1' expresses the final page and '−2' expresses the page previous to the final page with a base '−1' expressing the final page. When a user or the like does such setting, the setting range is unknown. In FIG. 9, A4, vertical, stapled left, automatic, single-sided printing, etc. are set as basic setting and a difference between the exceptional setting and the basic setting is described. For cover sheet setting for the exceptional page, 'double-sided, color' is set for the print setting and '1-2' is set for setting range, thus, the number of objective pages is '2'. For the next exceptional page setting, 'monochrome' is set for the print setting and '3-4' is set for setting range, thus, the number of objective pages is '2'. For back cover sheet setting of the final exceptional page, 'double-sided, color' is set for the print setting and 'unknown (−2 to −1)' is set for setting range, thus, the number of objective pages is '2'.

In such a case, the job generating unit 604 calculates the maximum total number of pages (six pages in the example of FIG. 9) of the objective pages in the exceptional pages by adding up the number of objective pages, which is set as exceptional pages. If basic setting is set, the job generating unit 604 makes the calculated value or more, i.e., 'six pages or more' the total number of pages. If the basic setting is not set, the job generating unit 604 makes the calculated value the total number of pages, to which print setting is adapted.

At step S707, the job generating unit 604 compares the total number of pages for the print data in the print data 01 obtained at step S705 and the total number of pages, to which print setting is adapted, obtained at step S706. If the comparison on the number of pages comes out as the total number of pages for the print data < the total number of pages, to which print setting is adapted, the job generating unit 604 proceeds to step S711. If otherwise, the job generating unit 604 proceeds to step S710. At step S710, the job generating unit 604 generates the job ticket 01 from the read print setting information and sends the print job including the print data 01 and the job ticket 01 to the device via the print data sending unit 605.

At step S711, as the total number of pages for the print data is insufficient for the total number of pages, to which print setting is adapted, the job generating unit 604 determines whether or not to execute the job. The judgment is performed as the job generating unit 604 asks the user to do selection by displaying a dialog screen indicating a confirmation message "The number of pages of the document does not match the number of pages set for exceptional pages. Do you really want to keep on printing?" Alternatively, a check box (not shown) indicating "Enforce printing even if the number of pages set does not match the number of pages of the document." on the exceptional page setting screen shown in FIG. 23 may be provided for a user to set the matter in advance.

If the job is to be executed, the job generating unit 604 proceeds to step S708. If the job is not to be executed, the job generating unit 604 proceeds to END, where the processing shown in FIG. 7 ends.

At step S708, as the total number of pages for the print data is insufficient for the total number of pages, to which print setting is adapted, the job generating unit 604 determines whether or not to execute the associating processing between the print data and the print setting (matching processing). At step S708, the job generating unit 604 may determine whether or not to execute the matching processing according to the operation mode set on the exceptional page setting screen shown in FIG. 23 by the operation information setting unit 602. The job generating unit 604 may display a setting dialog screen indicating "The number of pages in the document does not match the number of pages set for exceptional pages. Do you really want to execute matching processing on them?" for asking the user to select whether or not to execute matching processing each time it is required for the print data and execute the processing according to the user's selection.

If it is determined to apply the matching processing, the job generating unit 604 proceeds to step S709. If it is determined not to apply the matching processing, the job generating unit 604 proceeds to step S710 and sends the print job including a job ticket that is generated when the print setting contradicts the number of pages. In such a case, that contradiction of the numbers of pages is solved at the printer 104 side. Thus, the operational specification depends on the printer's specification. Specifically, if the printer to output is switched in such a case, the printed material differs from what the user expected may be produced or the print job may be canceled.

Figure 10:
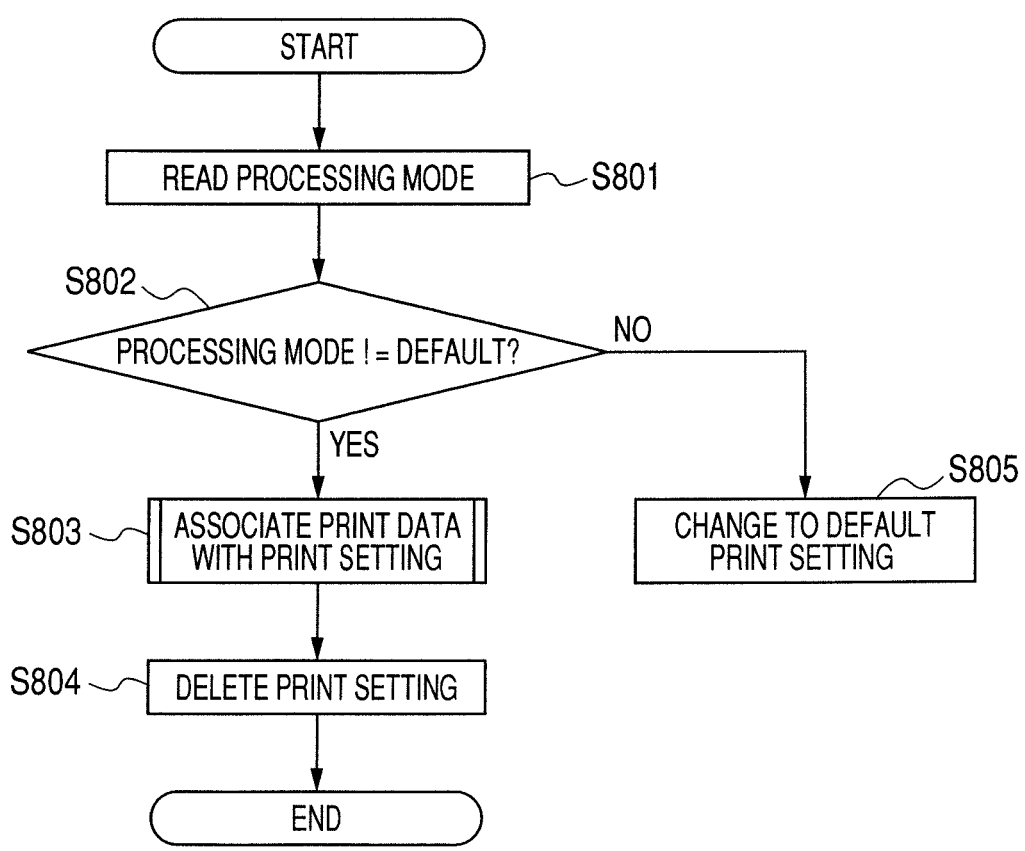
FIG. 10 is a diagram illustrating an example of matching processing between the print setting and the print data in the first embodiment.

At step S709, the job generating unit 604 executes the matching processing between the print setting and the print data. Details of the processing executed at step S709 will be described with reference to FIG. 10. FIG. 10 is a diagram illustrating an example of matching processing between the print setting and the print data in the first embodiment.

At step S801 in FIG. 10, the job generating unit 604 reads the processing mode. The job generating unit 604 needs to prioritize the types of processing in the print setting to execute matching between the print setting and the print data. Specifically, at step S801, the job generating unit 604 may decide the processing mode according to the priority of the type of processing in the print setting set by the operation information setting unit 602 or the like. The job generating unit 604 may display a setting UI or the like for asking the user to select the priority of the processing in the print setting each time it is required according to the print data and decide the processing mode according to the user's selection.

In the embodiment, the operations when three processing modes to be described later (A, B, C) will be described as processing mode.

Processing Mode A

A mode for matching between the print data and the print setting with the print setting prioritized as the cover sheet setting, back cover sheet setting and body/exceptional setting.

Processing Mode B

A mode for matching between the print data and the print setting with the print setting prioritized as the cover sheet setting, body/exceptional setting and back cover sheet setting.

Processing Mode C

A mode for making the print setting only predetermined default setting (basic setting).

Here, the default setting is a single setting without any concept of pages. For the default setting, any of the body setting, setting previously registered in the system or default setting set by the operational information setting unit 602 (a basic setting screen shown in FIG. 22) may be applied. In the processing modes A and B, the basic setting comes last in the priority. The processing modes A and B are applied when the number of pages in the basic setting is smaller than the number of objective pages set for exceptional pages. As the number of pages allocated to the basic setting is insufficient in the processing modes A and B, the basic setting can be omitted.

At step S802, the job generating unit 604 determines whether the processing mode read at step S801 is application of the default setting at the processing mode C or not. If the processing mode is application of the default setting of the processing mode C, the job generating unit 604 proceeds step S805 and replace the print setting by the default setting. If otherwise, the job generating unit 604 proceeds to step S803.

Figure 11:
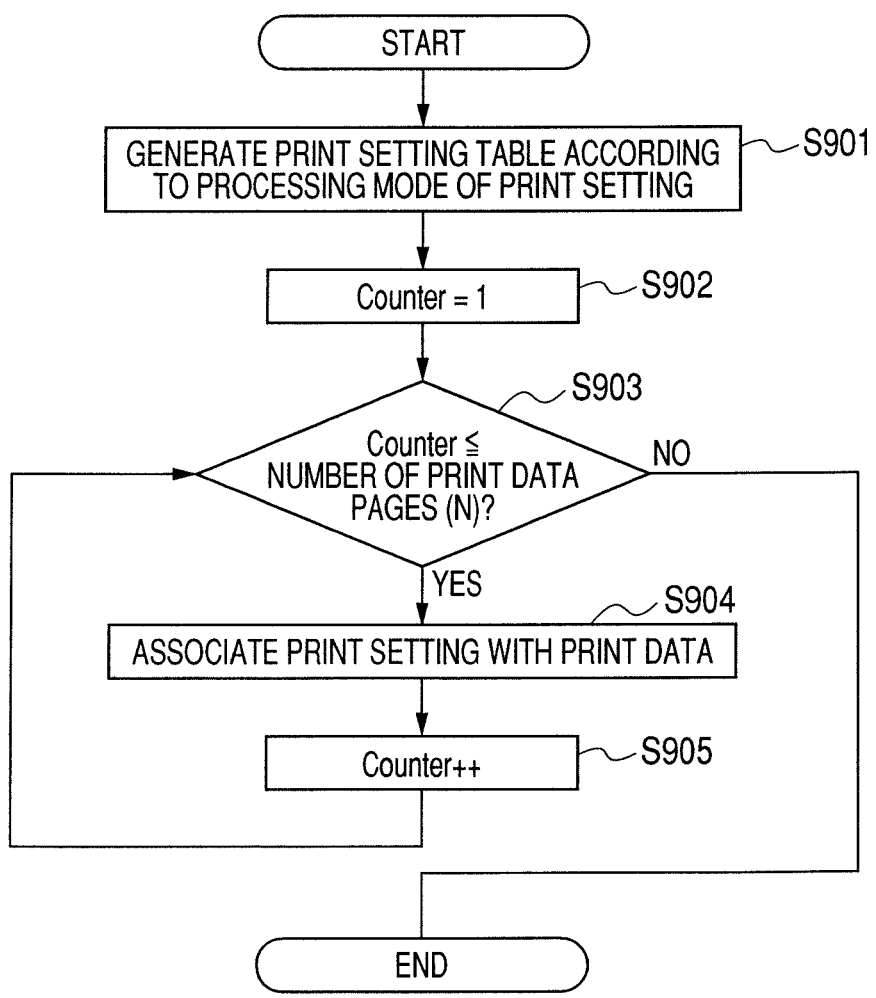
FIG. 11 is a diagram illustrating an example of associating processing between the print data and the print setting in the first embodiment.

At step S803, the job generating unit 604 executes associating processing between the print data and the print setting. Details of the processing at step S803 will be described with reference to FIG. 11. FIG. 11 is a diagram illustrating an example of associating processing between the print data and the print setting in the first embodiment.

At step S901 in FIG. 11, the job generating unit 604 generates a print setting table according to the processing mode of the print setting. Here, generation of a print setting table corresponding to the processing mode A and the processing mode B will be described by taking the above-mentioned print setting shown in FIG. 9 as an example.

First, the case of the processing mode A will be described.

When the processing mode A is applied, the priority in types of processing in the print setting is in the order of the cover sheet setting, the back cover sheet setting and the body/exceptional setting. The job generating unit 604 stores data for each page in the print setting table in the order of processing.

FIG. 12A is a diagram (I) illustrating an example of application of a print setting table. 'Counter' in the table indicates the counter number for referring to the table. The value incremented from the top is stored in the 'Counter'. Next, a page number of a page, to which the print setting is applied, is stored in 'Page number'. The attribution indicating which of the cover sheet, the back cover sheet, exception and the body the print setting is applied to is stored in 'Page attribute'. The presence of corresponding printing data is stored in 'Association with print data'. Information indicating respective page numbers of print data is stored in 'Print data Page'. As information on 'Association with print data' and 'Print data Page' is stored by values in the processing at step S904, the information is in an initialized state ('none' in the table) at step S901.

Similarly in the case of the processing mode B, the priority in types of processing in the print setting is in the order of the cover sheet setting, the body/exceptional setting and the back cover sheet setting. The job generating unit 604 stores data for each page in the print setting table in the order of processing.

At step S902, the job generating unit 604 initializes a Counter for counting up the processing. Specifically, the job generating unit 604 initializes the Counter to 1.

At step S903, the job generating unit 604 compares the total number of pages for the print data and the number in the Counter. If the number in the Counter is the total number of pages for the print data or less, the job generating unit 604 proceeds to step S904. If the number in the Counter is bigger than the total number of pages for the print data, the job generating unit 604 takes it that the print data has been associated with the print setting and proceeds to step S804.

At step S904, the job generating unit 604 associates the print setting with the print data. If the print data corresponding to the print setting is present for 'Association with print data' in the print setting table at step S904, the job generating unit 604 stores 'present'. The job generating unit 604 also stores the page number corresponding to 'Print data page' (the page number set for print setting).

At step S905, the job generating unit 604 increments the value in the Counter by one. FIG. 12B is a diagram illustrating an example of a print setting table for a result of a series of processing at steps S903 to S905 performed on print data with the total number of pages four.

According to 'Page number' in the print setting table, 'Association with print data' for the pages three and four is 'None'. That tells that it is the print setting without corresponding print data.

Similarly, FIGS. 13A and 13B are figures illustrating an example of a print setting table before and after the series of processing at steps S903 to S905 when the processing mode B is applied. It is apparent from the figures that it is the print setting without print data corresponding to 'Page number' '−2', '−1'.

After the processing, the job generating unit 604 proceeds to step S804 in FIG. 10. At step S804, the job generating unit 604 invalidates the setting with no corresponding print data for the print setting based on information on the print setting table. Specifically, the job generating unit 604 generates the print setting with the invalidated setting by performing comment out on the print setting or deleting the setting for the print setting corresponding to a predetermined page, for which 'Association with print data' on the print setting table is 'none'. As an invalidating method depends on the processing system, no particular method is defined in the embodiment. When the step ends, the job generating unit 604 proceeds to step S710 in FIG. 7.

At step S710, the job generating unit 604 generates the print job including the print data 01 and the job ticket 01, in which the print setting generated at the abovementioned steps is described, and sends the print job to the printer 104 via the print data sending unit 605.

The embodiment has automatically changed the print setting when the print data contradicts with the print setting. That is, the embodiment can eliminate contradiction (inconsistency) between the print data and the print setting by deleting the print setting without corresponding print data so as to output the printed material expected by the user. Therefore, usability in entering the print data using the hot folder is improved in the embodiment. If an exceptional page is not set in the print setting, the print data is not analyzed. That enables high-speed sending of the print job with a job ticket added.

(Second Embodiment)

In the first embodiment, a case where inconsistency between the print data and the print setting is eliminated as comment out is performed and the setting is deleted for the print setting when there is no print data corresponding to the print setting with page specification has been described as an example of eliminating the inconsistency.

The inconsistency between the print data and the print setting can also be eliminated by adding print data corresponding to the print setting to the print data without any change in the print setting.

The second embodiment will be described with reference to the drawings mainly for the parts different from the first embodiment.

Figure 14:
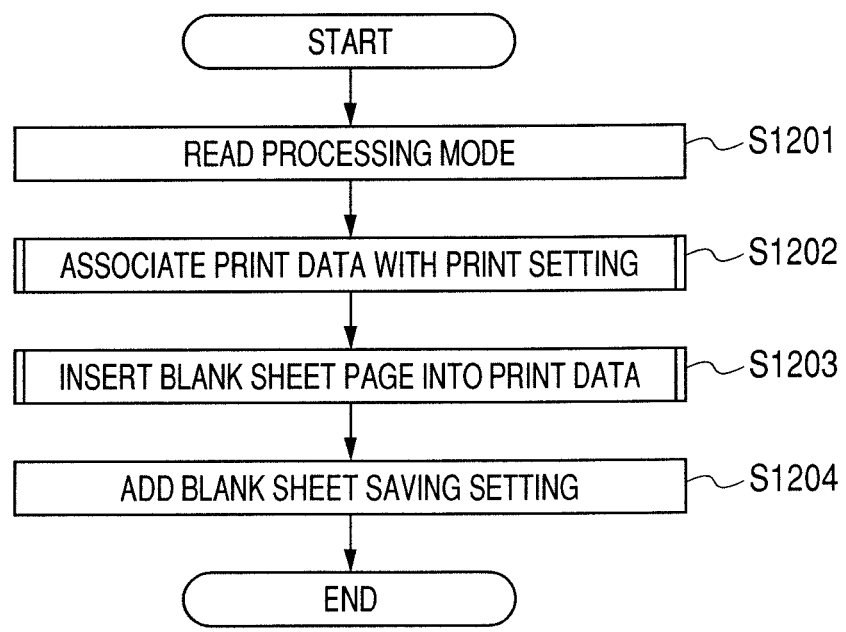
FIG. 14 is a diagram illustrating an example of matching processing between the print setting and the print data in a second embodiment.

FIG. 14 is a diagram illustrating an example of matching processing between the print setting and the print data in a second embodiment.

At step S1201, the job generating unit 604 reads the processing mode. The job generating unit 604 needs to prioritize the types of processing in the print setting to execute matching between the print setting and the print data. Specifically, at step S1201, the job generating unit 604 may decide the processing mode according to the priority of the type of processing in the print setting set by the setting unit 602 or the like.

The job generating unit 604 may display a setting UI or the like for asking the user to select the priority of the processing in the print setting each time it is required according to the print data and decide the processing mode according to the user's selection.

In the embodiment, the operations when two processing modes to be described later (A, B) will be described as processing mode.

Processing Mode A

A mode for matching between the print data and the print setting with the print setting prioritized as the cover sheet setting, back cover sheet setting and body/exceptional setting.

Processing Mode B

A mode for matching between the print data and the print setting with the print setting prioritized as the cover sheet setting, body/exceptional setting and back cover sheet setting.

At step S1202, the job generating unit 604 associates the print data with the print setting. Details of the processing at step S1202 are the same as those described in FIG. 11 of the first embodiment.

If the print data corresponding to the print setting is not present based on information on the print setting table at step S1203, the job generating unit 604 inserts a blank page corresponding to the print setting in the print data. Details of the processing at step S1203 will be described with reference to FIG. 15.

At step S1301, the job generating unit 604 initializes a Counter for counting up the processing. Specifically, the job generating unit 604 initializes the Counter to 1.

At step S1302, the job generating unit 604 compares the total number of pages for the print data and the number in the Counter. If the number in the Counter is the total number of pages for the print data or less, the job generating unit 604 proceeds to step S1303. If the number in the Counter is bigger than the total number of pages for the print data, the job generating unit 604 takes it as the blank page has been inserted in the print data and proceeds to step S1204 in FIG. 14.

At step S1303, the job generating unit 604 determines whether 'Association with print data' on the print setting table is 'none' or not. If the 'Association with print data' on the print setting table is 'none', the job generating unit 604 proceeds to step S1304. If the 'Association with print data' on the print setting table is 'present', the job generating unit 604 proceeds to step S1306.

At step S1304, the job generating unit 604 determines whether the value in 'Page number' on the print setting table is 'positive' or 'negative'. If the value in 'Page number' is 'positive', the job generating unit 604 proceeds to step S1305. If the value in 'Page number' is 'negative', the job generating unit 604 proceeds to step 1307.

At step S1305, the job generating unit 604 inserts blank data corresponding to the page registered in 'Page number' in the print data. Specifically, the job generating unit 604 inserts a blank page immediately after the (Page number −1) in the print data and proceeds the operation to step S1306.

At step S1307, the job generating unit 604 inserts blank data in the final page of the print data. At step S1306, the job generating unit 604 increments the value in the Counter by one.

Figure 16A:
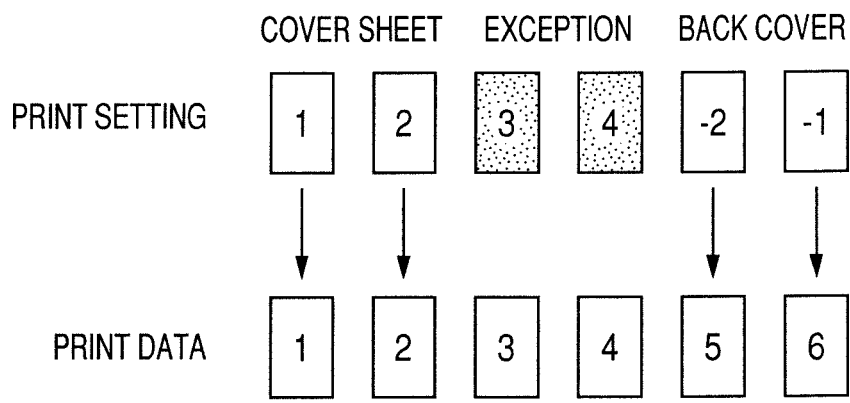
FIG. 16A is a diagram illustrating an example of print data generated when a processing mode A is applied to the print setting.
Figure 16B:
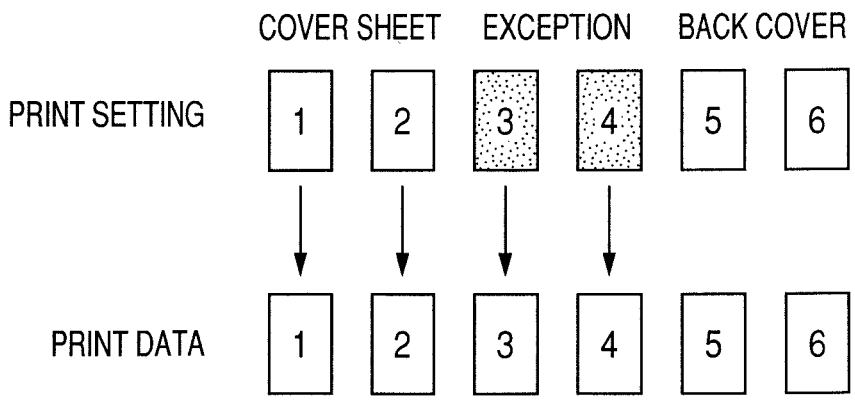
FIG. 16B is a diagram illustrating an example of print data generated when a processing mode B is applied to the print setting.

FIG. 16A is a diagram illustrating an example of print data generated when a processing mode A is applied to the print setting. FIG. 16B is a diagram illustrating an example of print data generated when a processing mode B is applied to the print setting.

Figure 15:
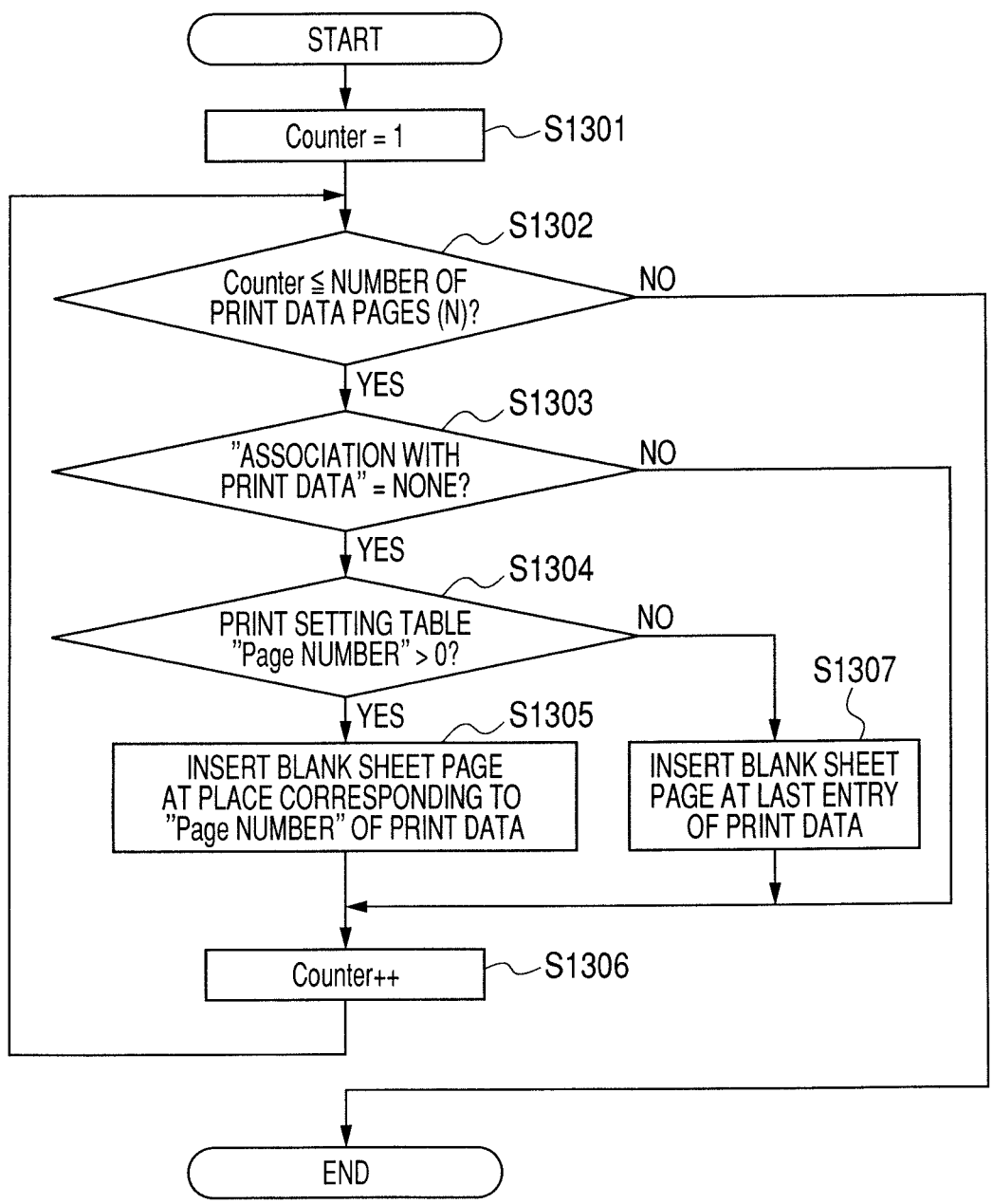
FIG. 15 is a diagram for describing a flow of inserting a blank page into the print data.

When the print data without inconsistent with the print setting is generated as the processing at steps shown in FIG. 15 is executed, the job generating unit 604 proceeds to step S1204 in FIG. 14. At step S1204, the job generating unit 604 adds blank sheet saving setting to the print setting. Here, the blank sheet saving setting, which is the setting for not printing any blank page in a document, is a function installed in any existing printers. When the processing at step S1204 ends, the job generating unit 604 proceeds to step S710 in FIG. 7.

The embodiment has automatically changed the print data when the print data contradicts with the print setting. That is, the embodiment can eliminate contradiction (inconsistency)

between the print data and the print setting by inserting a blank page into the print data so as to output the printed material expected by the user. Therefore, usability in entering the print data using the hot folder is improved in the embodiment.

(Third Embodiment)

In the first embodiment, a case where inconsistency between the print data and the print setting is eliminated as comment out is performed and the setting is deleted for the print setting when there is no print data corresponding to the print setting with page specification has been described as an example of eliminating the inconsistency.

The method used in the first embodiment is a method for allocating the print data to the print setting except for the cover sheet/back cover sheet is the method for allocating the print data to the print setting from the top of the print data. In the third embodiment, a case where association information for being associated with each of exceptional setting (exceptional setting association information or chapter separation information) is installed in the contents will be described. With the association information installed, the print data can be allocated to the top of a plurality of types of exceptional setting as mentioned later.

The third embodiment will be described with reference to the drawings mainly for the parts different from the first embodiment.

The third embodiment takes the same flow of operation as that shown in FIG. 7 for the first embodiment. An example of print setting in the third embodiment, however, will be described with reference to FIG. 17. FIG. 17 is a diagram illustrating an example of print setting in a third embodiment.

At step 706 in FIG. 7, the job generating unit 604 reads the number of objective pages for each setting range shown in FIG. 17. In the case of the print setting shown in FIG. 17, the total number of pages, to which print setting is adapted, is 17.

Figure 18:
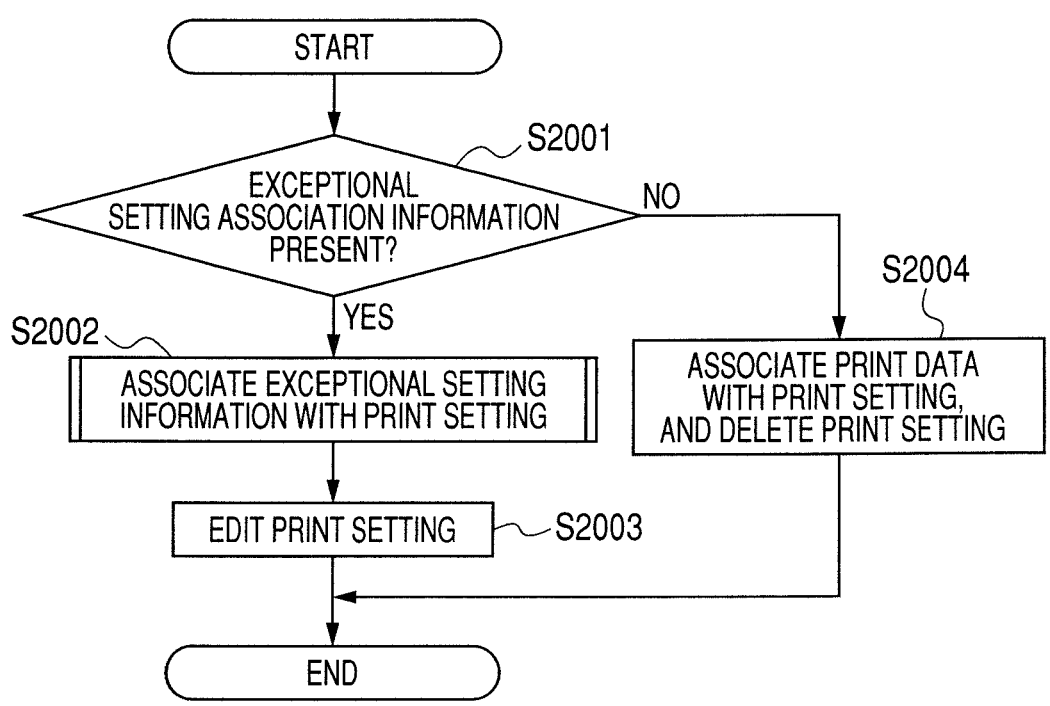
FIG. 18 is a diagram illustrating an example of matching processing between the print setting and the print data in the third embodiment.

FIG. 18 is a diagram illustrating an example of matching processing between the print setting and the print data in the third embodiment.

At step S2001, the job generating unit 604 determines the presence of the exceptional setting association information corresponding to the print data 01. FIG. 20A is a diagram illustrating an example of an exceptional setting association information table. 'Pint data page number' in the table indicates the page number when the pieces of the print data are counted in the descending manner from the top. 'Exceptional setting association information' indicates association with the exceptional setting in the print setting. The description of 'Print data Page number' being '3' and 'Exceptional setting association information' being '1' in the exceptional setting association information means that the third page in the print data corresponds to the exception 1 in the print setting.

The exceptional setting association information may be saved in the print data even if it is outside the print data. The chapter separation information in the print data may be used for the exceptional setting association information. If the chapter separation information is used, the chapter separation information for the print data is used with the first page number in the separated chapter corresponded with 1 and the second page number is the separated chapter corresponded with 2.

If it is determined that the exceptional setting association information is present at step S2001, the job generating unit 604 proceeds to step S2002. If it is determined that the exceptional setting association information is not present at step S2001, the job generating unit 604 proceeds to step S2004.

As the processing at step S2004 corresponds to the processing at a series of steps described in FIG. 10, the processing is omitted from the description in the embodiment.

Figure 19:
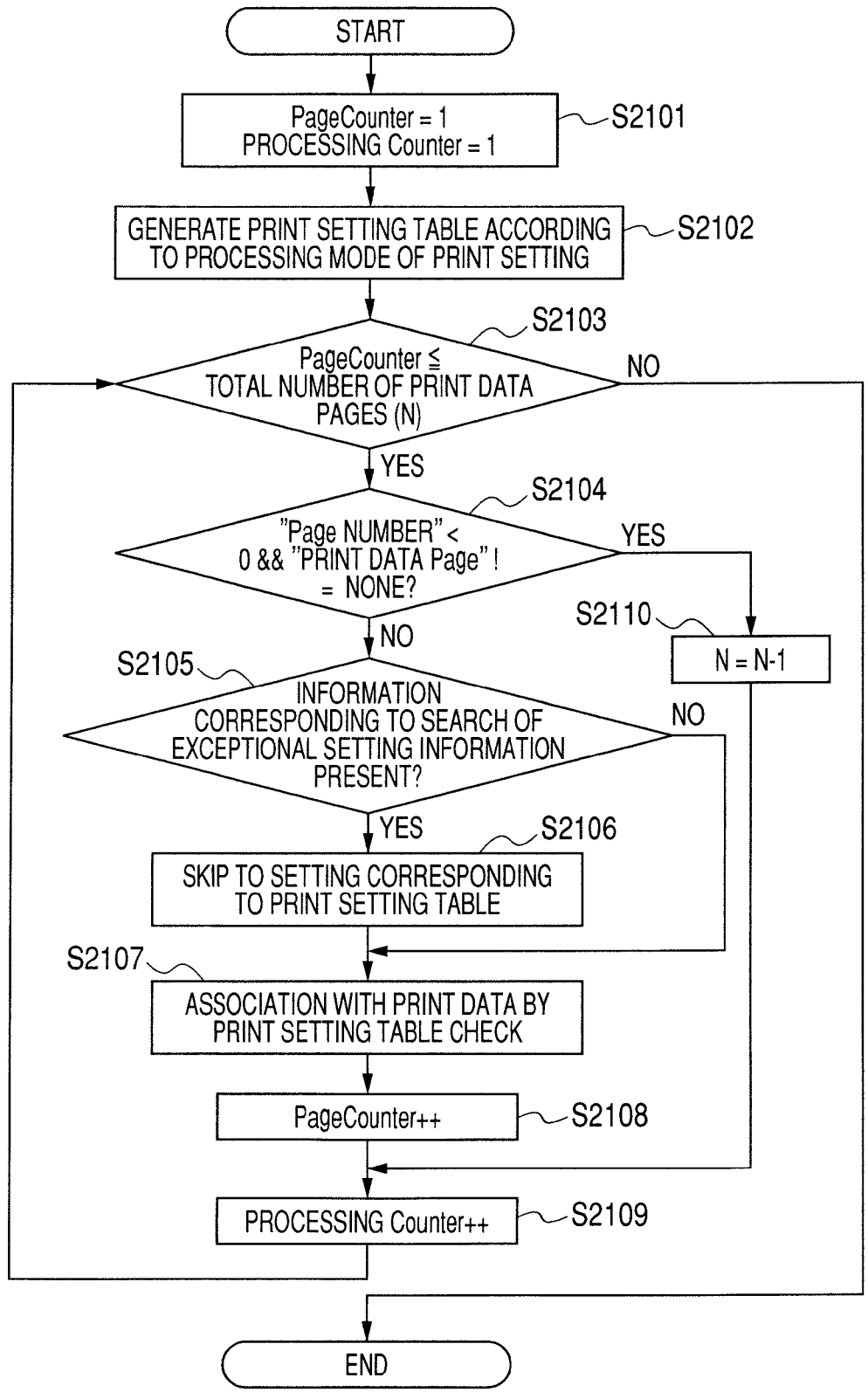
FIG. 19 is a diagram illustrating an example of associating processing between the print setting and the print data using exceptional setting information.

At step S2002, the job generating unit 604 associates the print setting and the print data using the exceptional setting information. Details of the processing at step S2002 will be described with reference to FIG. 19. FIG. 19 is a diagram illustrating an example of associating processing between the print setting and the print data using exceptional setting information.

At step S2101, the job generating unit 604 initializes Page Counter and the processing Counter, which are counter variables used in the processing, to 1. At step S2102, the job generating unit 604 generates a print setting table. In the embodiment, a case, in which the processing mode A in the first embodiment is applied to the print setting in FIG. 17, will be described with reference to FIG. 20B as an example. FIG. 20B is a diagram illustrating an example of an initialized print setting table.

In the embodiment, it is assumed that information on whether each print setting is set to single-sided or double-sided as 'print side setting' on the print setting table.

When the print setting table is set at step S2102, the job generating unit 604 proceeds to step S2103. At step S2103, the job generating unit 604 compares the Page Counter corresponding to Page number in the print data with the total number of pages (N) in the print data.

If the number in the Counter is the total number of pages for the print data or less, the job generating unit 604 proceeds to step S2104. If the number in the Counter is bigger than the total number of pages for the print data, the job generating unit 604 takes it that the print data has been associated with the print setting and proceeds to step S2003.

At step S2104, the job generating unit 604 determines whether the 'Page number' corresponding to the 'Counter' value is a negative value and 'print data Page' is 'none' or not by referring to the 'Counter' value on the print setting table from the value of the processing Counter. If the conditions are fulfilled, the job generating unit 604 proceeds to step S2110. If the conditions are not fulfilled, the job generating unit 604 proceeds to step S2105.

At step S2110, the job generating unit 604 performs the processing for a case where the Page number is a negative value. Specifically, the job generating unit 604 refers to the 'Counter' value on the print setting table from the value of the processing Counter and changes 'Association with print data' on the print setting table corresponding to the 'Counter' value to 'present'. The job generating unit 604 sets the current total number of pages N to 'Print data Page', decrement the total number of pages to N=N−1 after the setting is done, and proceeds to step S2109.

At step S2105, the job generating unit 604 determines whether the value of 'Print data Page number' corresponding to the value of Page Counter is present or not by referring to the exceptional setting association information table based on the value of Page Counter. If there is a value of 'Print data Page number' corresponding to the value of Page Counter, the job generating unit 604 proceeds to step S2106. If there is not a value of 'Print data Page number' corresponding to the value of Page Counter, the job generating unit 604 proceeds to step S2107.

At step S2106, the job generating unit 604 reads 'exceptional setting association information' corresponding to the value of 'Print data Page number' corresponding to the value of Page Counter from the exceptional setting association information table. Then, the job generating unit 604 searches for 'Page attribute' of the print setting table as shown in FIG. 20B based on the read 'exceptional setting association information' and identifies the 'Page attribute' matching the 'exceptional setting association information'. The job generating unit 604 sets the value of the 'Counter' corresponding to the identified 'Page attribute' as the value of the processing Counter.

At step S2107, the job generating unit 604 associates the print setting table with the print data. Specifically, the job generating unit 604 refers to the value of 'Counter' on the print setting table from the value of the processing Counter, and stores the current value of Page Counter to the 'Print data Page' corresponding to the value of the 'Counter'. The job generating unit 604 changes the description in 'Association with print data' corresponding to the value of the 'Counter' to 'present'. If 'Page attribute' is exceptional and 'a plurality of pages' is set for 'Page number' and when print data has been associated with all the pages in the range of pages, the job generating unit 604 makes 'Association with print data' to 'present'. If the print data has been associated only with a part of the range of pages, the job generating unit 604 makes 'Association with print data' to 'Part'.

At step S2108, the job generating unit 604 increments the value of Page Counter by one. At step S2109, the job generating unit 604 increments the value of the processing counter by one.

With a series of processing shown in FIG. 19, the exceptional setting information can be associated with the print setting.

As mentioned above, FIG. 20B is an example of a print setting table generated in the processing at step S2102. FIG. 20C is a diagram illustrating a result of processing at steps S2103 to S2210 on the print setting table using information in the exceptional setting association information table shown in FIG. 20A.

At step S2003 in FIG. 18, the job generating unit 604 reconfigures the print setting from information in the print setting table. Specifically, the job generating unit 604 changes the range of pages set for exceptional corresponding to the print setting to the range of pages registered in 'Print data Page' for the pages for which 'Association with print data' is set 'part'. The job generating unit 604 deletes pages, for which 'Association with print data' is set 'none', from the print setting.

When the processing at step S2003 ends, the job generating unit 604 proceeds to the processing at step S710 in FIG. 7.

The third embodiment has allocated the print data to the top of a plurality of types of exceptional setting by installing the association information. If no print data corresponding to the print setting specified with pages is present, inconsistency can be eliminated as comment out is performed on the print setting or setting is deleted.

(The Other Embodiments)

It is a matter of course that objects of the present invention are achieved by the manner below: The recording medium (or storage medium) recording the program codes of the software program for implementing the functions of the abovementioned embodiments is supplied to the system or the apparatus. Then, the computer (or a CPU or an MPU) of the system or the apparatus reads out and executes the program codes stored on the recording medium. In such a case, the program codes read out from the recording medium implement the functions of the abovementioned embodiments. Thus, the recording medium recording the program codes forms the present invention.

As a computer executes the read out program codes, an operating system (OS) running on the computer executes all or a part of the actual processing based on the instructions of the program codes. It is a matter of course that the present invention includes a case where the functions of the abovementioned embodiments are executed in the processing.

It is assumed that the program codes read out from the recording medium are written in the expanded card inserted in a computer or memory provided for the expanded unit connected with a computer. It is a matter of course that the present invention also includes a case where the functions of the abovementioned embodiments are executed in the processing executed when the expanded card or a CPU provided for the expanded unit executes all or a part of the actual processing based on the instructions of the program codes.

When the present invention is applied to the recording medium, the recording medium stores program codes corresponding to the flowchart described above.

Each of the abovementioned embodiments can change the print data or the print setting to eliminate contradiction between the print data and the print setting when such contradiction occurs and output the printed material desired by the user. Therefore, the embodiments can improve usability in entering the print data using the hot folder.

Although preferred embodiments of the present invention have been described, the present invention is not limited to those particular embodiments and various modifications and alterations can be made within the spirit of the present invention described in the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-303086, filed Nov. 8, 2006, which is hereby incorporated by reference herein in its entirety.

What is claimed is:
1. An apparatus comprising:
a processor; and
a memory,
wherein the processor functions as:
a read unit configured to read a print setting set for print data;
a specifying unit configured to specify a page number of a page included in the print data, to which page the print setting is applied; and
a determining unit configured to determine print settings for pages included in the print data based on the read print setting and the specified page number,
wherein if the read print setting includes a back cover print setting, different from an entire print setting for the entirety of the print data, for a back cover of the print data, the specifying unit specifies, in a first way set for the back cover print setting, a first page number of a page included in the print data, to which page the back cover print setting is applied,
wherein if the read print setting further includes an exceptional page print setting, different from the entire print setting and from the back cover print setting, the specifying unit specifies, in a second way set for the exceptional page print setting, a second page number of a page included in the print data, to which page the exceptional page print setting is applied, and wherein if the specified first and second page numbers are identical to each other, the determining unit determines that the back cover print setting is applied to the page for the identical page number, in place of the exceptional page print setting.

2. The apparatus according to claim 1, wherein the read unit reads the print setting based on a file stored in a folder.

3. The apparatus according to claim 2, wherein the processor further functions as:

a calculation unit configured to calculate a total number of pages of contents entered in the folder, wherein if the exceptional page print setting is not set for a page in the print setting to be applied to the contents, the processing in the calculation unit is not executed, and a print job sending unit configured to send a print job, which is the contents with a work instruction sheet for the print setting, to a printing apparatus.

4. The apparatus according to claim 1, wherein the processor further functions as:

a detection unit configured to detect that contents are entered into a folder;

a check unit configured to check, on the basis of the detection by the detection unit, whether or not the contents have a format with a page concept if the exceptional page print setting is set for a page in a print setting to be applied to the contents entered in the folder; and a display unit configured to display a confirmation screen relating to setting on a display device if the check unit checks that the contents do not have a format with the page concept.

5. The apparatus according to claim 1, wherein the processor further functions as:

a job generation unit configured to generate a print job including contents and the print setting, wherein the job generation unit displays a setting change screen relating to a change in the print setting on a display device so that the contents do not contradict with the print setting.

6. The apparatus according to claim 1, wherein, in the read print setting, a page number counted from a first page of the print data is indicated as the page having the exceptional print setting and a page number counted from a final page of the print data is indicated as the page corresponding to the back cover.

7. An information processing method for an information processing apparatus comprising a processor and a memory, wherein the processor functions to perform the steps of:

a reading step of reading a print setting set for print data;

a specifying step of specifying a page number of a page included in the print data, to which page the print setting is applied; and a determining step of determining print settings for pages included in the print data based on the read print setting and the specified page number, wherein if the read print setting includes a back cover print setting, different from an entire print setting for the entirety of the print data, for a back cover of the print data, the specifying step specifies, in a first way set for the back cover print setting, a first page number of a page included in the print data, to which page the back cover print setting is applied, wherein if the read print setting further includes an exceptional page print setting, different from the entire print setting and from the back cover print setting, the specifying step of specifies, in a second way set for the exceptional page print setting, a second page number of a page included in the print data, to which page the exceptional page print setting is applied, and wherein if the specified first and second page numbers are identical to each other, the determining step determines that the back cover print setting is applied to the page for the identical page number, in place of the exceptional page print setting.

8. The method according to claim 7, wherein the reading step reads the print setting based on a file stored in a folder.

9. The method according to claim 8, wherein the processor further performs:

a calculation step of calculating a total number of pages of contents entered in the folder, wherein if the exceptional page print setting is not set for a page in the print setting to be applied to the contents, the processing in the calculation unit is not executed, and a print job sending step of sending a print job, which is the contents with a work instruction sheet for the print setting, to a printing apparatus.

10. The method according to claim 7, wherein the processor further performs:

a detection step of detecting that contents are entered into a folder;

a checking step of checking, on the basis of the detection by the detection step, whether or not the contents have a format with a page concept if the exceptional page print setting is set for a page in a print setting to be applied to the contents entered in the folder; and a displaying step of displaying a confirmation screen relating to setting on a display device if the checking step checks that the contents do not have a format with the page concept.

11. The method according to claim 7, wherein the processor further performs:

a job generation step of generating a print job including contents and the print setting, wherein the job generation step displays a setting change screen relating to a change in the print setting on a display device so that the contents do not contradict with the print setting.

12. The method according to claim 7, wherein, in the read print setting, a page number counted from a first page of the print data is indicated as the page having the exceptional print setting and a page number counted from a final page of the print data is indicated as the page corresponding to the back cover.

* * * * *